(12) United States Patent
Mishra et al.

(10) Patent No.: US 12,282,543 B2
(45) Date of Patent: Apr. 22, 2025

(54) SECURING ON-CHIP COMMUNICATION USING DIGITAL WATERMARKING

(71) Applicant: University of Florida Research Foundation, Inc., Gainesville, FL (US)

(72) Inventors: Prabhat Kumar Mishra, Gainesville, FL (US); Thelijjagoda Subodha Nadeeshan Charles, Matara (LK); Vincent Bindschaedler, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 601 days.

(21) Appl. No.: 17/525,176

(22) Filed: Nov. 12, 2021

(65) Prior Publication Data

US 2022/0156366 A1    May 19, 2022

Related U.S. Application Data

(60) Provisional application No. 63/115,716, filed on Nov. 19, 2020.

(51) Int. Cl.
*G06F 21/55* (2013.01)
*G06F 7/58* (2006.01)
(Continued)

(52) U.S. Cl.
CPC ............ *G06F 21/552* (2013.01); *G06F 7/582* (2013.01); *G06F 15/7807* (2013.01);
(Continued)

(58) Field of Classification Search
CPC .... G06F 21/552; G06F 7/582; G06F 15/7807; G06F 2221/034; G06F 21/71;
(Continued)

(56) References Cited

U.S. PATENT DOCUMENTS

2020/0380121 A1\* 12/2020 Pasricha ............... G06F 21/554

OTHER PUBLICATIONS

Biswas et al., Source Authentication Techniques for Network-on-Chip Router Configuration Tables, 2016. (Year: 2016).\*

(Continued)

*Primary Examiner* — Trong H Nguyen
(74) *Attorney, Agent, or Firm* — Thomas | Horstemeyer, LLP

(57) ABSTRACT

The present disclosure describes digital watermark detection systems and methods. In one such system, a plurality of intellectual property cores are integrated on a system-on-chip, such that the intellectual property cores comprise a first intellectual property core and a second intellectual property core. The system further includes a first network interface connected to the first intellectual property core that can encode a first digital watermark into a packet stream designated for the second intellectual property core. The system further includes a second network interface connected to the second intellectual property core that can receive the packet stream and decode the packet stream to generate a second digital watermark. The second network interface is further configured to perform a validation test on the packet stream and deliver the packet stream to the second intellectual property core when the first digital watermark is determined to match the second digital watermark.

20 Claims, 13 Drawing Sheets

(51) Int. Cl.
    *G06F 15/78*      (2006.01)
    *H04L 9/06*       (2006.01)
    *H04L 49/109*     (2022.01)

(52) U.S. Cl.
    CPC ............ *H04L 9/065* (2013.01); *H04L 49/109* (2013.01); *G06F 2221/034* (2013.01); *H04L 2209/34* (2013.01)

(58) Field of Classification Search
    CPC ... H04L 9/065; H04L 49/109; H04L 2209/34; H04L 9/0662; H04L 2209/608
    See application file for complete search history.

(56) References Cited

OTHER PUBLICATIONS

Li et al., Homomorphic Encryption-Based Robust Reversible Watermarking for 3D Model, Mar. 1, 2020. (Year: 2020).*
Wang et al., Robust correlation of encrypted attack traffic through stepping stones by manipulation of interpacket delays, 2003. (Year: 2003).*
Wang et al., Network Flow Watermarking Attack on Low-Latency Anonymous Communication Systems, 2007. (Year: 2007).*
Park et al., Adaptive Watermarking against Deliberate Random Delay for Attack Attribution through Stepping Stones, 2007. (Year: 2007).*
Iacovazzi et al., Network Flow Watermarking: A Survey, 2017. (Year: 2017).*

* cited by examiner

| α \ m | 2 | 3 | 4 | 5 | 6 |
|---|---|---|---|---|---|
| 50 | X | X | X | 0.952 / 0.989 / 4.27% | 0.970 / 0.991 / 4.75% |
| 60 | X | X | 0.967 / 0.985 / 4.17% | 0.983 / 0.995 / 4.73% | X |
| 70 | X | 0.968 / 0.971 / 3.89% | 0.987 / 0.990 / 4.54% | X | X |
| 80 | 0.955 / 0.960 / 3.42% | 0.986 / 0.989 / 4.19% | X | X | X |

FIG. 11

SECURING ON-CHIP COMMUNICATION USING DIGITAL WATERMARKING

CROSS-REFERENCE TO RELATED APPLICATION

This application claims priority to co-pending U.S. provisional application entitled, "Securing On-Chip Communication Using Digital Watermarking," having Ser. No. 63/115,716, filed Nov. 19, 2020, which is entirely incorporated herein by reference.

STATEMENT REGARDING FEDERALLY SPONSORED RESEARCH OR DEVELOPMENT

This invention was made with government support under 1936040 awarded by the National Science Foundation. The government has certain rights in the invention.

BACKGROUND

System-on-chip (SoC) developers utilize Intellectual Property (IP) cores from third-party vendors due to increasing design complexity and cost, as well as time-to-market constraints. A typical SoC consists of a wide variety of IP cores (such as processor, memory, controller, field-programmable gate array (FPGA), etc.) that interact using a Network-on-Chip (NoC). This global trend of designing SoCs using third-party IPs raises serious concerns about security vulnerabilities. Since NoC facilitates communication between all IPs in an SoC, NoC is the ideal place for any malicious implants (such as hardware Trojans) to hide and launch a plethora of attacks. Due to the resource-constrained nature of SoCs, developing security solutions against such attacks is a major challenge. In particular, in an eavesdropping attack, a Trojan infected router copies packets transferred through the NoC and re-routes the duplicated packets to an accompanying malicious application running on another IP in an attempt to extract confidential information. While authenticated encryption can thwart such attacks, it incurs unacceptable overhead in resource-constrained SoCs.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 11 shows a comparison of BDSR and execution time variation in accordance with various embodiments of the present disclosure.

DETAILED DESCRIPTION

The present disclosure describes various embodiments of systems, apparatuses, and methods of a lightweight alternative defense based on digital watermarking techniques. The present disclosure presents theoretical models to provide security guarantees and experiments using realistic System-on-Chip (SoC) models and diverse applications demonstrate that exemplary digital watermark detection systems and methods can significantly outperform state-of-the-art methods.

Design considerations for roads in a city involve accessibility, traffic distribution, and handling of specific scenarios. For example, an important objective in the design of a network of roads is to ensure ease of access to popular and important places in the city such as offices, schools, parks, etc. If prominent places are all located in the same area, the roads in that area will be congested while roads in other areas will remain (relatively) empty. An architect should ensure that the traffic is as uniformly distributed as possible or the main roads have enough lanes to mitigate congestion. A System-on-Chip (SoC) designer faces similar challenges when designing the communication infrastructure connecting all the SoC components, e.g., processor cores, memories, controllers, input/output, etc. As the complexity of SoCs increase, more and more Intellectual Property (IP) cores are integrated on the same SoC. State-of-the-art SoCs have hundreds of components. For example, a typical automotive SoC may include 100-200 diverse IP cores. The demand for scalable and high-throughput interconnects has made Network-on-chip (NoC) the standard interconnection solution for complex SoCs. Due to time-to-market constraints, it is a common practice for manufacturers to outsource IPs to third-party vendors. Typically, manufacturers produce only a few important IPs in-house and integrate them with third-party IPs to obtain the final SoC. As a result of this distributed supply chain, it is feasible for an attacker to insert malicious implants, such as hardware Trojans, into the IPs. A recent occurrence of a hardware security breach due to third-party vendors aiming at industrial espionage raised concerns across top US authorities, where the attack was facilitated by a hardware Trojan that acted as a covert backdoor and spied on computer servers used by more than 30 companies in USA, including Amazon and Apple.

Figure 1:
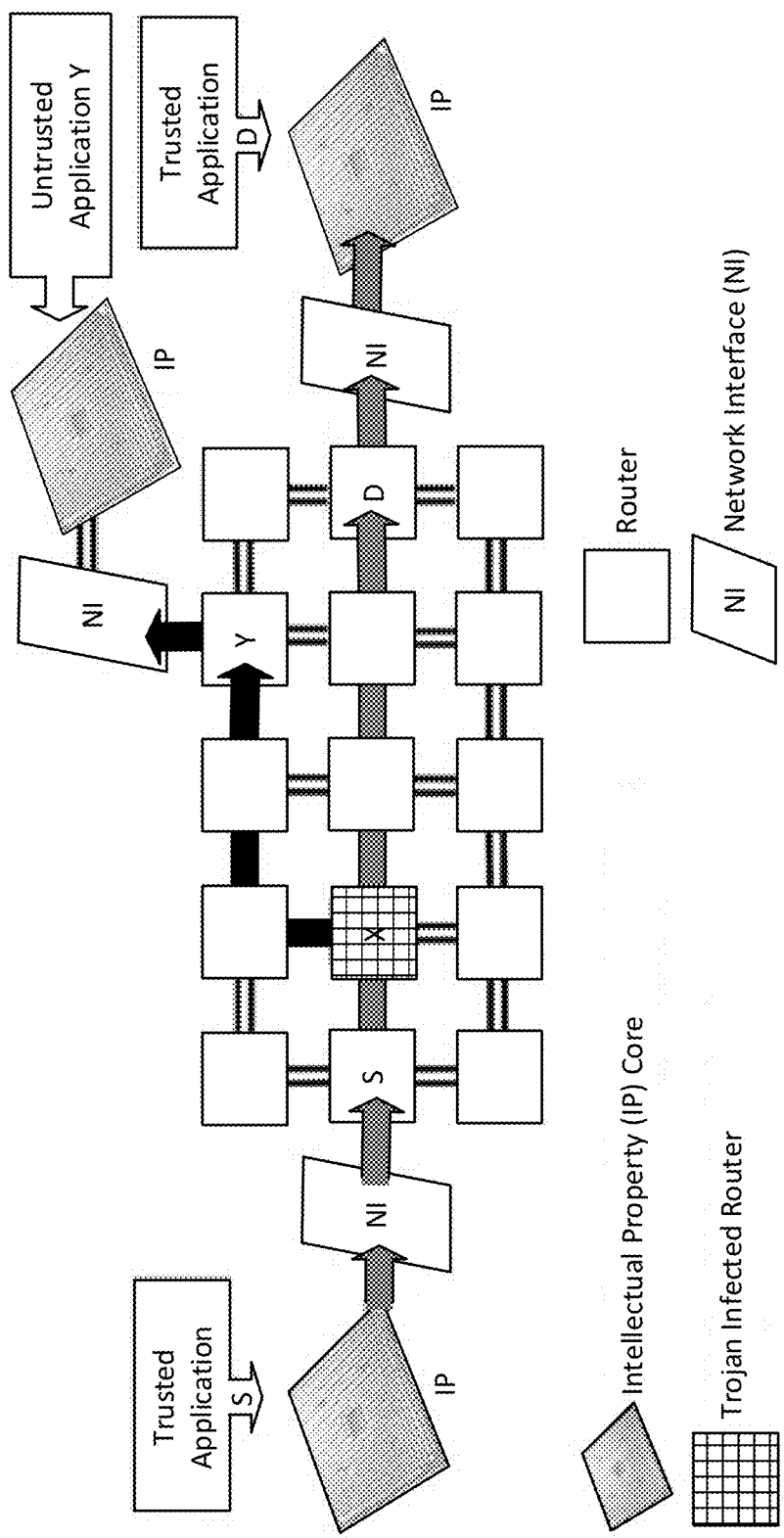
FIG. 1 shows an illustrative example of an eavesdropping attack through colluding hardware and software in accordance with the present disclosure.

To address this concern, the present disclosure considers the following attack scenario. A hardware Trojan integrated in the NoC IP launches an attack to eavesdrop on the NoC packets. The goal is to exfiltrate information while remaining hidden, and thus the Trojan will not perform any action that would reveal its presence, such as corrupting packets to cause SoC malfunction (data integrity attacks) or degrade performance causing denial-of-service (DoS) attacks. Previous work has explored the most effective way of launching an eavesdropping attack in NoC, considering attack effectiveness and difficulty to detect the Trojan, and identified Trojan(s) inserted in NoC component(s) colluding with another malicious IP(s) as the strongest attack model. An illustrative example of this scenario is shown in FIG. 1, where a hardware Trojan-infected router (denoted with an 'X') and an accomplice application (denoted with a 'Y') launches an eavesdropping attack and the infected router copies packets passing through it & sends them to the accomplice application running on another malicious IP. This hardware-software collusion attack is similar to the Illinois Malicious Processor (IMP). Such setting and related threat models have been the focus of several prior studies.

NoC security research has proposed authenticated encryption (AE) as a solution to eavesdropping attacks. With AE, packets are encrypted to ensure confidentiality and an authentication tag is appended to each packet to ensure integrity (and detect re-routed packets). However, the use of AE as the defense to eavesdropping attacks is suboptimal for two reasons. First, AE incurs significant performance degradation on resource-constrained devices. Second, authentication tags may be unnecessarily complex if used only for the purpose of detecting eavesdropping attackers who seek to remain undetected as long as possible—and thus are unlikely to interfere with data integrity.

The present disclosure considers whether it is possible to replace authenticated encryption with a lightweight defense while maintaining security against eavesdropping attacks by replacing the costly computation of authentication tags with a lightweight eavesdropping attack detection mechanism based on digital watermarking. The attack detection capabilities achieved by digital watermarking is coupled with encryption to ensure data confidentiality. To the best of the inventors' knowledge, this is the first work that secures NoC-based SoCs using digital watermarking.

Accordingly, the present disclosure presents a lightweight digital watermarking based security mechanism to detect eavesdropping attacks and shows that an exemplary digital watermark detection system/method is able to detect attacks in a timely manner. For example, experimental results show that the exemplary digital watermark detection system/method incurs significantly lower performance overhead compared to authenticated encryption, which makes it an ideal fit for resource-constrained SoCs.

In general, state-of-the-art NoC security revolves around protecting information traveling in the network against physical, software, and side channel attacks. While detecting hardware Trojans in NoC IPs during design time is still in its infancy, most solutions aim to detect/mitigate the threat of hardware Trojans during runtime. To identify most prominent threats in NoC-based SoCs, 25 related papers published in the last 10 years were surveyed and categorized into five widely studied categories of NoC security attacks: (i) eavesdropping, (ii) spoofing and data integrity, (iii) denial-of-service, (iv) buffer overflow and memory extraction, and (v) side channel attacks. Results are shown in Table I (below) that provides a summary of NoC security papers found in literature categorized by the following attack classes and defense types. Such attack classes include Eavesdropping (EAV), Spoofing/Data Integrity (SDI), Denial-of-service (DOS), Buffer Overflow and Memory Extraction (BOM), and Side Channel Attacks (SCA), and the defense types include Obfuscation (OBF). Detection (DET) and Localization (LOC).

TABLE I

| Paper | Attack Class | Defense Type |
|---|---|---|
| Sajeesh, 2011 [12] | EAV | OBF, DET |
| Porquet, 2011 [13] | BOM | OBF |
| Wang, 2012 [14] | SCA | OBF |
| Kapoor, 2013 [15] | EAV | OBF, DET |
| Yu, 2013 [16] | SDI | OBF |
| Ancajas, 2014 [3] | EAV | OBF |
| Saeed, 2014 [17] | BOM | DET |
| Sepúlveda, 2015 [18] | BOM | OBF, DET |
| Rajesh, 2015 [19] | DOS | DET |
| Biswas, 2015 [20] | DOS | DET |
| Reinbrecht, 2016 [21] | SCA | OBF, DET |
| Boraten, 2016 [10] | EAV | OBF |
| Prasad, 2017 [22] | DOS | DET |
| Sepúlveda, 2017 [11] | EAV | OBF |
| Frey, 2017 [23] | DOS | OBF, DET |
| Indrusiak, 2017 [24] | SCA | OBF |
| Sepúlveda, 2018 [25] | DOS | DET |
| Hussain, 2018 [7] | EAV | DET, LOC |
| Kumar, 2018 [9] | DOS | OBF |
| Chittamuru, 2018 [26] | EAV | OBF, DET |
| Lebiednik, 2018 [27] | EAV | OBF |
| Indrusiak, 2019 [28] | SCA | OBF |
| Charles, 2019 [4] | DOS | DET, LOC |
| Raparti, 2019 [2] | EAV | DET, LOC |
| Charles, 2020 [8] | EAV | OBF |

The survey makes it evident that eavesdropping attacks are indeed one of the most widely explored threat models related to security in NoC-based SoC. The threat model used in the present disclosure is well-established and has been considered in previous works that proposed solutions to protect the SoC from a compromised NoC IP eavesdropping on data. Ancajas et al. proposed a combination of data scrambling, packet authentication and node obfuscation to prevent eavesdropping attacks. See D. M. Ancajas, K. Chakraborty, and S. Roy, "Fort-NoCs: Mitigating the Threat of a Compromised NoC," in Proceedings of the 51st Annual Design Automation Conference (DAC). ACM, 2014, pp. 1-6. A combination of threshold voltage degradation and an encoding based packet duplication detector was proposed by Raparti et al. See V. Y. Raparti and S. Pasricha, "Lightweight Mitigation of Hardware Trojan attacks in NoC-Based Manycore Computing," in Proceedings of the 56th Annual Design Automation Conference (DAC). ACM, 2019, p. 48. Charles et al. proposed to increase the difficulty of information extraction by introducing anonymous routing in the NoC. See S. Charles et al., "Lightweight Anonymous Routing in NoC Based SoCs," in Design, Automation & Test in Europe Conference & Exhibition (DATE). IEEE, 2020. Kumar et al. attempted to reduce the effectiveness of hardware Trojans trying to manipulate data packets using bit shuffling and Hamming error correction codes. See Manoj Kumar J. Y. V et al., "Run Time Mitigation of Performance Degradation Hardware Trojan Attacks in Network on Chip," in IEEE Computer Society Annual Symposium on VLSI (ISVLSI), 2018, pp. 738-743. When eavesdropping attacks are considered, packet authentication combined with encryption (authenticated encryption) is the most popular countermeasure.

The process of hiding information related to digital data in the data itself is called digital watermarking. It has been widely used in domains such as broadcast monitoring, copyright identification, transaction tracking, and copy control. For example, in the movie industry, a unique watermark can be embedded in every movie. If the movie later gets published on the internet illegally, the embedded watermark can be used to identify the person who leaked it. In network flow watermarking, watermarks are embedded into the packet flow using packet content, timing information, or packet size. This can be used for tracing botmasters in a botnet, tracing other network-based attacks, and service dependency detection. To the best of the inventors' knowledge, network flow watermarking has never been studied in the context of NoC.

The global trend of distributed design, validation, and fabrication has raised concerns about security vulnerabilities. Malicious implants, such as hardware Trojans, can be inserted into the RTL (register transfer level) design or into the netlist of an IP core with the intention of launching attacks without being detected at the post-silicon verification stage or during runtime. Insertion of Trojans can happen in many places of the long, distributed supply chain such as by an untrusted CAD tool or designer or at the foundry via reverse engineering. As evidence of the globally distributed supply chain of NoC IPs, iSuppli, an independent market research firm, reports that the FlexNoC on-chip interconnection architecture is used by four out of the top five Chinese fabless semiconductor OEM (original equipment manufacturer) companies. In fact, Arteris, the company that developed FlexNoC, achieved a sales growth of 1002% over a three-year time period through IP licensing.

Therefore, there is ample opportunity for attackers to integrate hardware Trojans in the NoC IP and compromise the SoC. NoC IPs are ideal candidates to insert hardware Trojans due to several reasons: (i) the complexity of NoC IPs makes it extremely difficult to detect hardware Trojans during functional verification as well as runtime, (ii) extracting data from NoC packets allows attackers to obtain confidential information without relying on memory access or hacking into individual IPs, and (iii) the distributed nature of NoC components across the SoC makes it easier to launch attacks.

Eavesdropping attacks, also known as snooping attacks, pose a serious threat to applications running on many-core SoCs, given that IP cores that are integrated on the same SoC use the NoC IP when communicating through message passing as well as through shared memory. For example, the Intel Knights Landing architecture prompts memory requests/responses from cores to traverse the NoC for shared cache look-ups and for off-chip memory accesses. Therefore, eavesdropping on data transferred through the NoC allows adversaries to extract confidential information.

If we consider an adversary consisting of a hardware Trojan-infected router and a colluding malicious application running on an IP, the goal of the adversary is to exfiltrate confidential information by observing NoC traffic without being detected. Remaining hidden is key for the adversary to exfiltrate as much information as possible. Because the adversary must remain hidden, it is assumed that the adversary does not interfere with the normal operation of the NoC. This means that the adversary does not modify the content of packets (attack on integrity) or cause large delays in processing of packets (denial-of-service) as either would likely lead to detection.

Thus, eavesdropping attacks by malicious NoC IPs rely on the hardware Trojan creating duplicate packets with modified headers (specifically, destination address in the header) and sending them into the NoC for an accomplice application to receive them. As discussed, FIG. 1 shows an illustrative example of an eavesdropping attack through colluding hardware and software, in which a hardware Trojan integrated in a router (X) copies packets passing through the router and sends the copies to a malicious application running on an IP (Y). In the figure, an NI and an IP core are connected to each router, but for clarity, only three such pairs are shown. The present disclosure considers a commonly used 2D Mesh NoC topology where IPs are connected to the NoC, more specifically to the router, via a network interface (NI). When the NI receives a message from the local IP, the message is packetized and injected into the network. It is noted that while most NoCs facilitate flits, which is a further breakdown of a packet used for flow control purposes, the present disclosure is only concerned with the packet level for the ease of explanation as an exemplary method remains the same at the flit level as well.

Packets injected into the NoC are routed using the hop-by-hop, turn-based XY routing algorithm and are received by the destination router. The NI then combines the packets to form the message which is passed to the intended destination IP. In the example of FIG. 1, two trusted applications running in nodes S and D are communicating with each other, and an eavesdropping attack is launched to steal confidential information. The attack is carried out by two main components: (i) a Trojan-infected router, and (ii) an IP running a malicious application. The malicious router (X) copies packets passing through the router and sends the copies to the IP running the malicious program at node Y, which reads the confidential information. To facilitate this attack, several steps should be carried out by the attacker. First, the hardware Trojan is inserted by the third-party NoC IP provider during design time, in which the Trojan is designed such that it can act upon commands sent by the malicious application. Once the SoC is deployed, the malicious application sends commands at a desired time to launch the attack. The Trojan then starts copying and sending packets to the malicious application. The malicious application can also send commands to pause the attack to avoid being detected.

Figure 2:
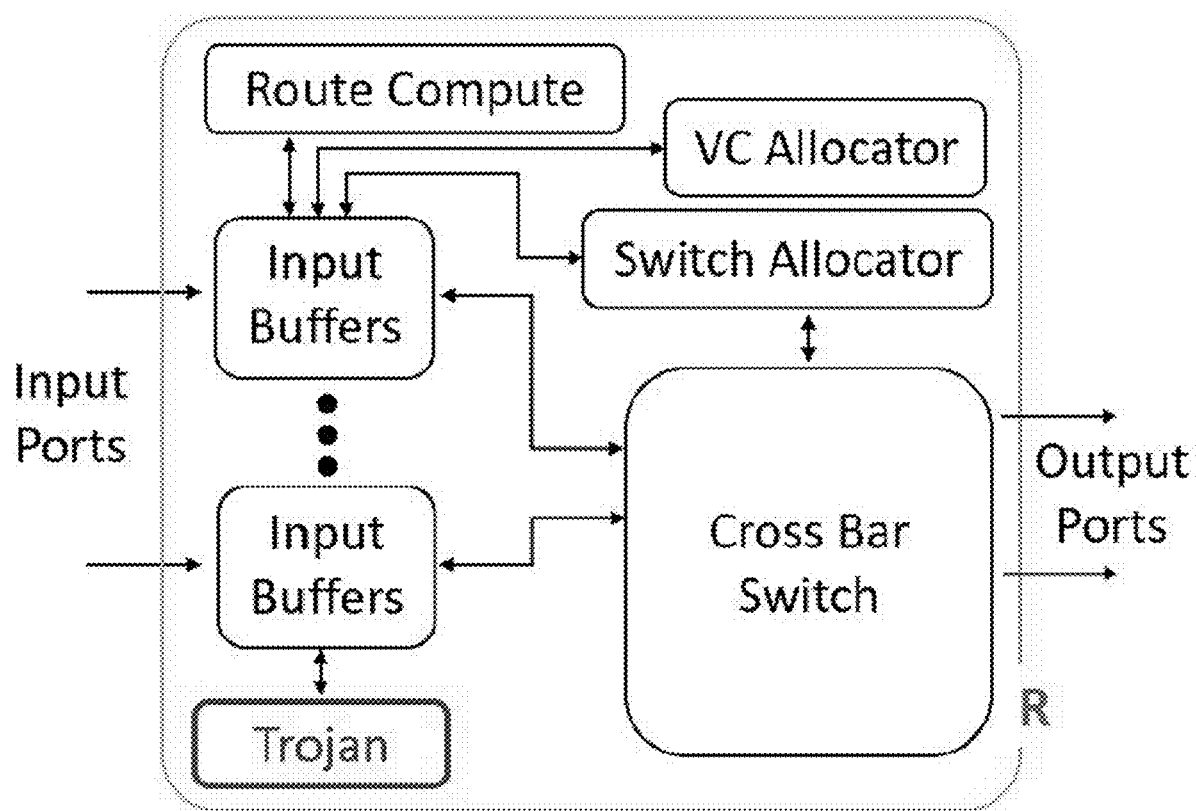
FIG. 2 shows a block diagram of a router design infected with a hardware Trojan on a Network-on-Chip (NoC) that launches an adversarial attack in accordance with the present disclosure.

Next, FIG. 2 shows a block diagram of a router design infected with the hardware Trojan that launches the attack described in the threat model. The Trojan copies packets arriving at the input buffer, changes the header information so that the new destination of the packet is where the malicious application is (node Y according to the illustrative example), and injects the new packet back to the input buffers so that the packet gets routed through the NoC to reach Y. The Trojan does not tamper with any other part of the packet, except for the header to re-route the packet, due to two reasons: (i) the goal is to extract information, so corrupting data defeats the purpose, and (ii) corrupting data increases chances of the Trojan getting detected. Since the original packet is not tampered with and is routed to the intended destination D, the normal operation of the SoC is preserved. The Trojan also has a very small area and power footprint. Ancajas et al. used a similar threat model in their work and reported 4.62% and 0.28% area and power overheads, respectively, when compared with the router design without the Trojan. The performance overhead when copying and routing packets to the malicious application is less than 1%. Therefore, the likelihood of the Trojan being detected is very small unless additional security mechanisms are implemented.

As discussed, AE is a widely accepted countermeasure against eavesdropping attacks. Encryption provides packet confidentiality and authentication is capable of detecting re-routed packets. Since the header is modified by the hardware Trojan in order to re-route the packet to the malicious application, the authentication tag validation fails and the attack is detected. To analyze the performance overhead introduced by an AE scheme, FFT, RADIX (RDX), FMM and LU benchmarks from the SPLASH-2 benchmark suite are executed on an 8×8 Mesh NoC-based SoC with 64 IPs using the gem5 simulator considering two scenarios: (1) Default-NoC in which a bare NoC that does not implement encryption or authentication; and (2) AE-NoC in which an NoC uses an authenticated encryption scheme.

Figure 3A:
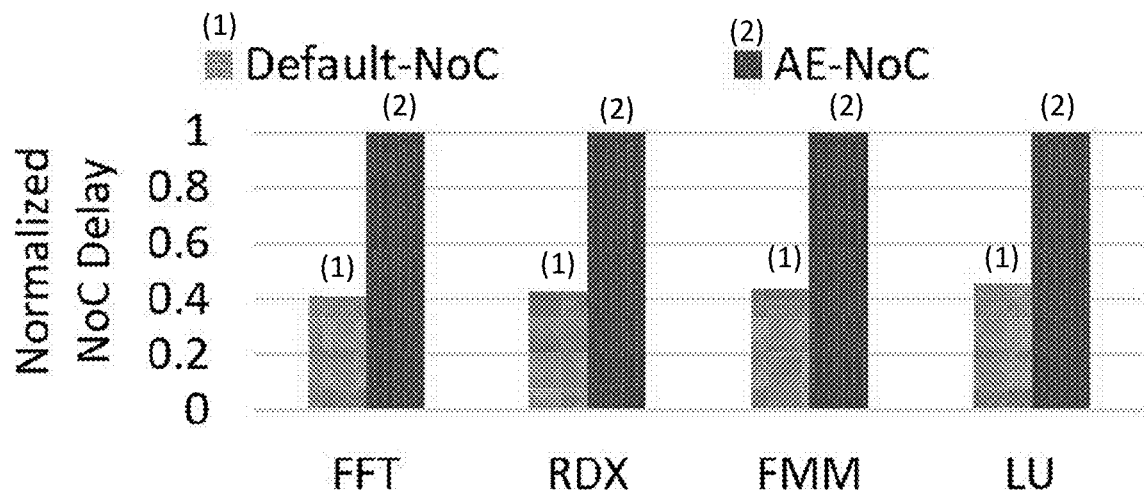
FIGS. 3A-3B show experimental results for performance overhead introduced by an authentication encryption scheme by comparing (A) NoC delay and (B) execution time across different levels of security.
Figure 3B:
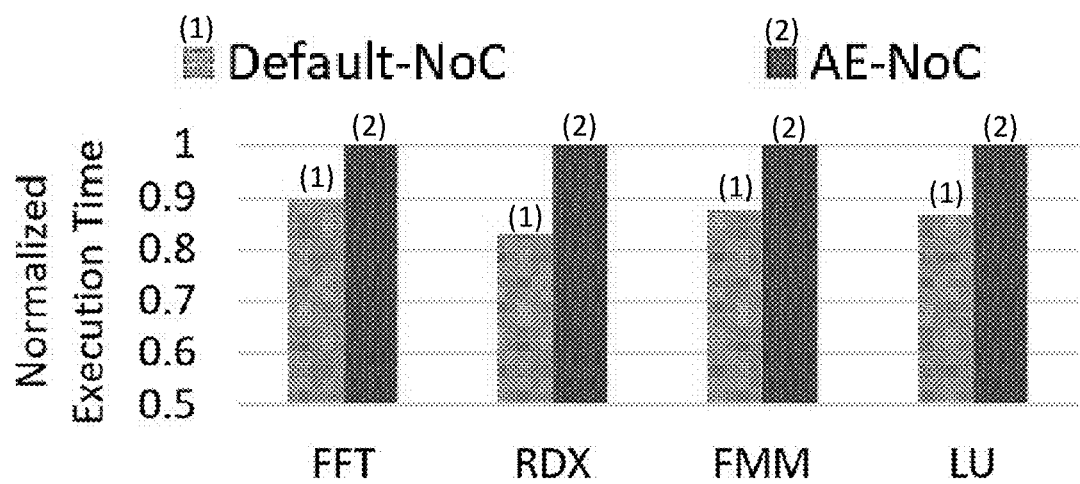

Experimental results are shown in FIGS. 3A-3B, in which (A) an NoC delay and (B) execution time comparison are shown across different levels of security for four SPLASH-2 benchmarks. A 12-cycle delay was assumed for encryption/decryption and authentication tag calculation when simulating AE-NoC according to the evaluations in the works of Kapoor et al. See H. K. Kapoor et al., "A Security Framework for NoC Using Authenticated Encryption and Session Keys," Circuits, Systems, and Signal Processing, Vol. 32, No. 6, pp. 2605-2622, 2013. The values are normalized to the scenario that consumes the most time. AE-NoC shows 59% (57% on average) increase in NoC delay (average NoC traversal delay for all packets) and 17% (13% on average) increase in execution time compared to the Default-NoC. The overhead for security has a relatively lower impact on execution time compared to the NoC delay, since the execution time also includes the time for executing instructions and memory operations (in addition to NoC delay). NoC delay in Default-NoC case is caused by delays at routers, links, and the NI. In AE-NoC, in addition to those delays, encryption/decryption delays and authentication tag calculation/validation delays are added to each packet. Additional delays are due to complex encryption/decryption operations and hash calculations for authentication.

When security is considered, Default-NoC leaves the data totally vulnerable to attacks, whereas AE-NoC ensures confidentiality and data integrity. For systems with real-time requirements, an execution time increase of 17% to accommodate a security mechanism is unacceptable. Furthermore, validating the authentication tag for each packet contributes to the SoC power consumption. Since the Trojan is rarely activated and only the packet header is modified (packet data is not corrupted) to avoid detection, authenticating each packet becomes inefficient in terms of both performance and power consumption. Clearly, authenticating to detect re-routed packets introduces unnecessary overhead. It would be ideal if the security provided by AE-NoC could be achieved while maintaining the performance of Default-NoC. However, in resource-constrained environments, there is always a trade-off between security and performance.

Accordingly, the present disclosure provides a novel digital watermarking-based security mechanism that incurs minimal overhead while providing high security. In various embodiments, an exemplary digital watermark detection approach replaces authentication by watermarking. In addition to watermarking, encryption is used to ensure data confidentiality. Such a method achieves a better trade-off than: (1) no authentication that is vulnerable to credible Trojan attacks, and (2) authenticated encryption, which incurs performance degradation prohibiting their use in applications with real-time constraints.

Next, a few key definitions and concepts used in an exemplary watermarking construction are presented. For Hoeffding's Inequality is presented. As such, let $\{X_1, \ldots, X_n\}$ be a sequence of independent and bounded random variables with $X_i \in [a, b]$ for all i, where $-\infty < a \leq b < \infty$. Then, $$Pr\left[\left|\frac{1}{n}\sum_{i=1}^{n}(X_i - \mathbb{E}[X_i])\right| \geq t\right] \leq e^{\left(-\frac{2nt^2}{(b-a)^2}\right)}$$

for all $t \geq 0$. By Hoeffding's Lemma, which says if $X_i \in [a, b]$ then $\mathbb{E}[e^{\lambda X}] \leq e^{\lambda^2(b-a)^2/8}$ for any $\lambda \geq 0$, a random variable bounded in [a, b] is sub-Gaussian with variance proxy $$\sigma^2 = \frac{(b-a)^2}{4}.$$

Therefore, $$Pr\left[\left|\frac{1}{n}\sum_{i=1}^{n}(X_i - \mathbb{E}[X_i])\right| \geq t\right] \leq e^{\left(-\frac{nt^2}{2\sigma^2}\right)} \quad (1)$$

Let C be a binary code of length w, size M (i.e., having M codewords) and minimum Hamming distance $\delta$ between any two codewords denoted by (w, M, d). The distance distribution of C can be calculated as:

$$B_i = \frac{1}{M}\sum_{c \in C}|c' \in C : \mathcal{D}(c, c') = i|, 0 \leq i \leq n$$

It is clear that $B_0 = 1$ and $B_i = 0$ for $0 < i < d$.

Let A(w, d) represent the maximum number of codewords M in any binary code of length w and minimum Hamming distance d between codewords. Finding optimum A(w, d) for a given w and d is an NP-Hard problem. However, exact solutions are known for few combinations of values and in the general case, upper and lower bounds of the maximum number of codewords are known.

The flow of packets sent from one IP (source) to another IP (destination) is referred to as a packet stream. An exemplary detection mechanism relies on the following assumptions about the architecture and threat model. First, the Trojan does not tamper with the legitimate packet content as this may reveal its presence. The Trojan only modifies the header of duplicated packets to change the destination (data fields of the duplicated packets are not tampered with) and it allows the legitimate packets to pass as usual. Next, packets are not dropped by intermediate routers and the order of packets in a packet stream is kept constant. This is reasonable as deadlock and livelock free XY routing is used together with FIFO buffers. Additionally, when the attacker injects copied packets into the NoC, all the packets can get delayed due to congestion. While this delay is random, the maximum delay is bounded.

Figure 4:
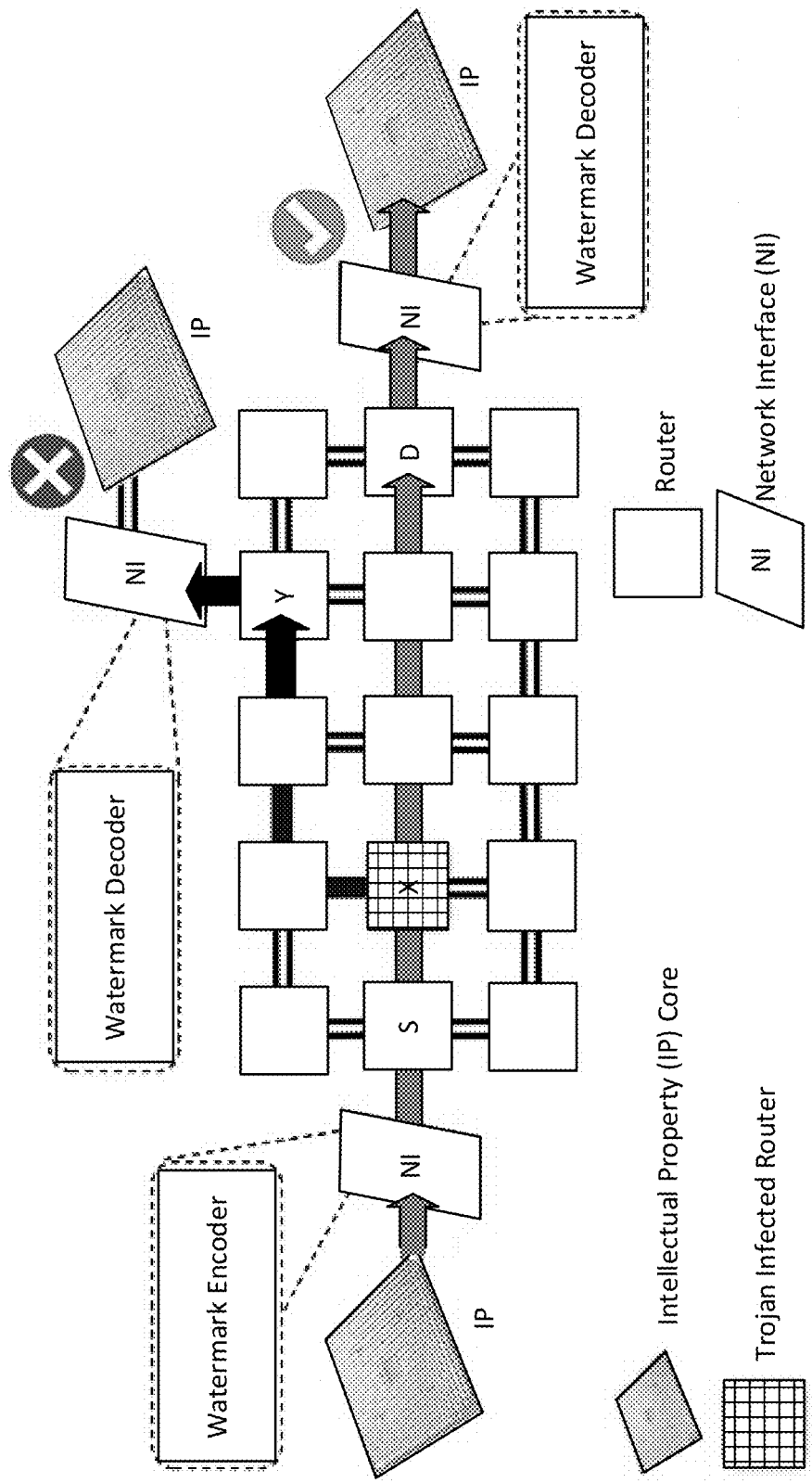
FIG. 4 shows an overview of an exemplary digital watermark detection system where the watermark encoder and decoder are implemented at the network interface (NI) of each node in accordance with embodiments of the present disclosure.

In accordance with embodiments of the present disclosure, an exemplary digital watermark detection system and method involve embedding a unique watermark into every packet stream. FIG. 4 shows an overview of an exemplary digital watermark detection system where the watermark encoder and decoder are implemented at the NI of each node. It is reasonable to assume that the NI can be trusted since the NI acts as the interface between all the IPs in the SoC and the NoC IP and is typically designed inhouse. The NI at source S encodes the watermark and the NI at destination D decodes it to identify that the packet stream is valid, or in other words, the packets in the packet stream are intended to be received by D. This process is followed by each source/destination pair in the NoC. In case of an attack, the watermark decoded by the NI of the receiving node (node Y according to the illustrative example), will be invalid and a potential attack is flagged to warn of the attack. To ensure this behavior, the watermarking mechanism can have the following characteristics: (1) The watermark is unique to each packet stream; and (2) There is a shared secret between S and D, which is "hard" for any other node to guess or deduce.

In addition to watermarking, encryption/decryption modules are implemented at the NIs, such that the watermark is embedded in the encrypted packets and is decoded before the decryption process. Encrypting packets is required to provide data confidentiality during packet transfers and due to the nature of an exemplary digital watermark detection method that allows the malicious application to receive some packets before detecting the attack. NoC-based SoC architectures with encryption/decryption modules may be implemented at the NI. An exemplary digital watermark detection method can be implemented on top of those solutions, where the performance improvement is achieved by replacing the authentication scheme with an exemplary lightweight digital watermark detection scheme.

In various embodiments, the watermark $\omega_{SD}$ is embedded by the NI of S before the packets are injected into the NoC. A timing-based watermark (as opposed to size or content-based) is used for three reasons: (i) timing alterations are harder to detect by an attacker, (ii) it allows a lightweight implementation as it is easy to manipulate, and (iii) it does not alter the packet content allowing encryption schemes to be implemented together with watermarking. The watermark is embedded by slightly delaying certain packets in the stream. If $\omega_{SD}$ is unique, $\omega_{SD}$ should be correctly decoded at the NI of destination D with high probability. In contrast, the probability of decoding $\omega_{SD}$ as valid at any other NI should be very low.

Given n packets of a packet stream $P_{SD}$ such that:

$$P_{SD}=\{p_{SD,1}, p_{SD,2}, \ldots, p_{SD,i}, \ldots, p_{SD,n}\}$$

the inter-packet delay (IPD) between any two packets can be calculated as $\tau_{SD,i,i+1}=t_{SD,i+1}-t_{SD,i}$ where $t_{SD,i}$ is the timestamp of the packet $p_{SD,i}$. Without loss of generality, for the ease of illustration, we will remove "SD" from the notation and denote the packet stream $P_{SD}$ as P and IPD $\tau_{SD,i,i+1}$ as $\tau_i$.

The encoder selects 2m packets $\{p_{r_1}, p_{r_2}, \ldots, p_{r_{2m}}\}$ out of the n packets of packet stream P. The selected packets are paired with another 2m packets (outside of the initially selected 2m packets) to create 2m pairs such that each pair is constructed as $\{p_{r_z}, p_{r_z+x}\}$ where x≥1 and z=1, ..., 2m. Therefore, it is assumed that the packet stream has at least 4m packets. The IPD between each pair of packets can be calculated as:

$$\tau_{r_z}=t_{r_z+x}-t_{r_z} \quad (2)$$

Given that the 2m packets are selected independently and randomly, the IPDs are modeled as independently and identically distributed (IID) random variables with a common distribution. The IPD values are then divided into 2 groups. Since we had 2m pairs of packets, each group will have m IPD values. If we let the IPD values of the two groups be denoted by $\tau_k^1$ and $\tau_k^2$ (k=1, ..., m), respectively, it follows that both $\tau_k^1$ and $\tau_k^2$ are IID. Therefore, the expected values μ (and the variances) of the two distributions are equal. Let Δ be the average difference between the two IPD distributions:

$$\Delta = \frac{1}{m} \cdot \sum_{k=1}^{m} \frac{\tau_k^1 - \tau_k^2}{2} \quad (3)$$

Then, we can calculate the expected value and variance of Δ:

$$\mathbb{E}[\Delta] = \mathbb{E}[\tau_k^1] - \mathbb{E}[\tau_k^2] = 0,$$

$$\text{Var}(\Delta) = \frac{\sigma^2}{m},$$

where $\sigma^2$ is the variance of the distribution $$\frac{\tau_k^1 - \tau_k^2}{2}.$$

In other words, the distribution of Δ is symmetric and centered around zero. The parameter m is referred to as the sample size.

The core idea of an exemplary watermarking approach is to intentionally delay a selected set of packets to shift the Δ distribution left or right to encode the watermark bits in the timing information of the packets. Specifically, the distribution of Δ can be shifted along the x-axis to be centered on −α or α by decreasing or increasing Δ by α, where α is called the shift amount. As a result, the probability of Δ being negative or positive will increase. Concretely, to embed bit 0, Δ is decreased by α. To embed bit 1, Δ is increased by α. Decreasing Δ can be done by decreasing each $$\frac{\tau_k^1 - \tau_k^2}{2}$$

by α (Equation 3). Decreasing $$\frac{\tau_k^1 - \tau_k^2}{2}$$

can be achieved by decreasing each $\tau_k^1$ by a and increasing each $\tau_k^2$ by α. It is easy to see that increasing Δ can be done in a similar way. Decreasing or increasing one IPD ($\tau_k^1$) is achieved by delaying the first packet or the second packet of the pair, respectively.

The encoded watermark can be detected by calculating Δ and checking if Δ is positive or negative. If Δ>0, bit 1 is decoded. Otherwise (if Δ≤0) bit 0 is decoded. This scheme can be extended to a w-bit watermark ($\omega_{SD}$) by repeating the above process w times. During the decoding process, a w-bit watermark ($\omega'_{SD}$) is extracted from the packet stream and if the hamming distance between $\omega_{sp}$ and $\omega'_{sp}$ is lower than a predefined error margin $\delta$, it can be concluded that the watermark embedded at the source S is detected at the receiver. If the watermark does not match, an attack is flagged, thereby causing a warning to be generated.

Figure 5:
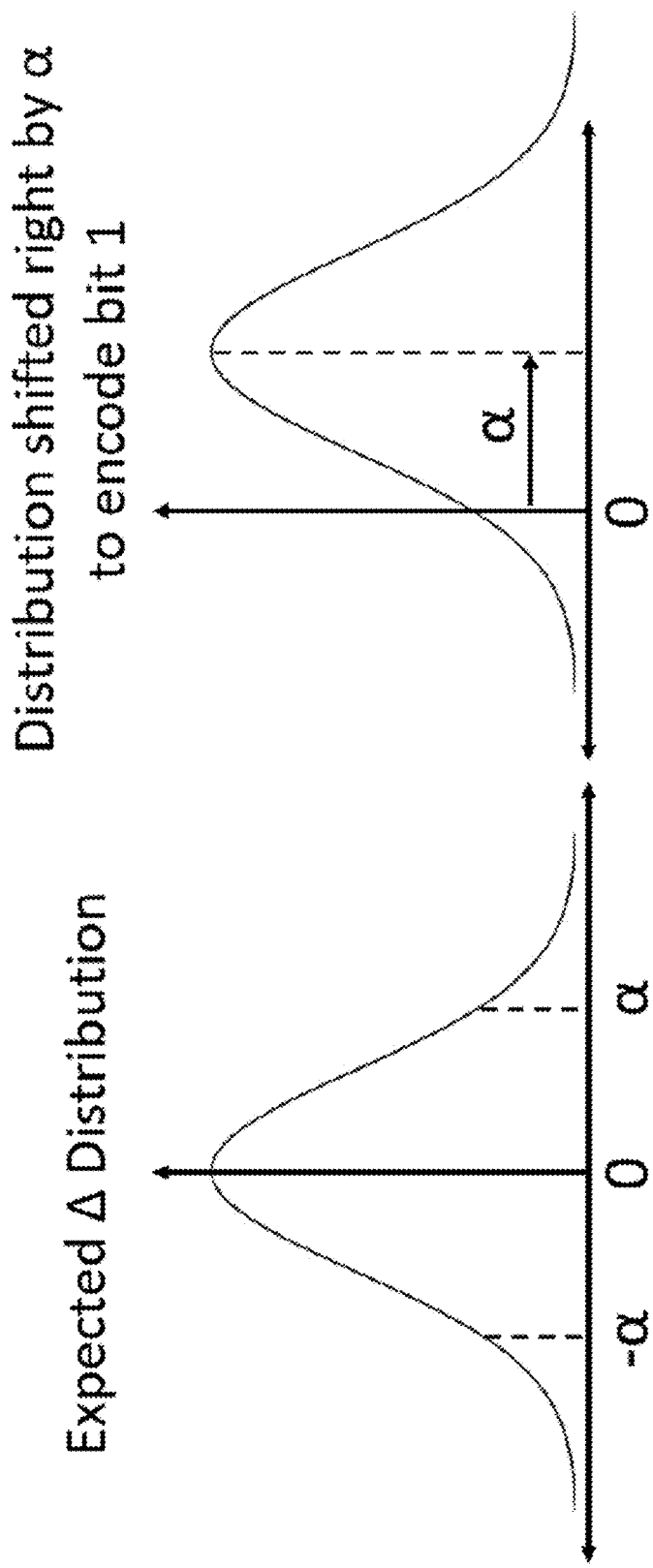
FIG. 5 shows the distribution of the average difference between inter-packet delay after shifting the distribution in accordance with the present disclosure.

FIG. 5 shows the distribution of $\Delta$ and the corresponding distribution after shifting $\Delta$ by $\alpha>0$. Since an exemplary scheme is probabilistic, there is a probability that the embedded watermark bits will be incorrectly decoded, thus leading to false alarms (false positives) or missed detection (false negatives). This is because for any $\alpha>0$, a small portion of the distribution of $\Delta$ falls outside the range $(-\infty, \alpha]$. Therefore, if bit 0 is embedded, there is a small probability that the bit will be incorrectly decoded as 1. It can be seen that this probability is the same as the probability that a sample from the unshifted distribution takes a value outside the range $(-\infty, \alpha]$. Similarly, a bit encoded to be 1 can be decoded incorrectly because samples from $\Delta$ have a small probability of falling outside the range $[-\alpha, \infty)$. However, we can tune parameters m (sample size), $\alpha$ (shift amount), and $\delta$ (error margin) to achieve a very high (nearly 100%) decoding success rate.

To provide formal guarantees, the bit decoding success rate (BDSR) is defined as the probability of the embedded watermark bit being decoded correctly (for a shift amount of $\alpha$). This quantity is denoted by Pr $[\Delta<\alpha]$. Note that the BDSR also depends on m and $\sigma^2$, but this is not explicit in the notation Pr $[\Delta<\alpha]$ because it is implicitly captured by $\Delta$.

Figure 6:
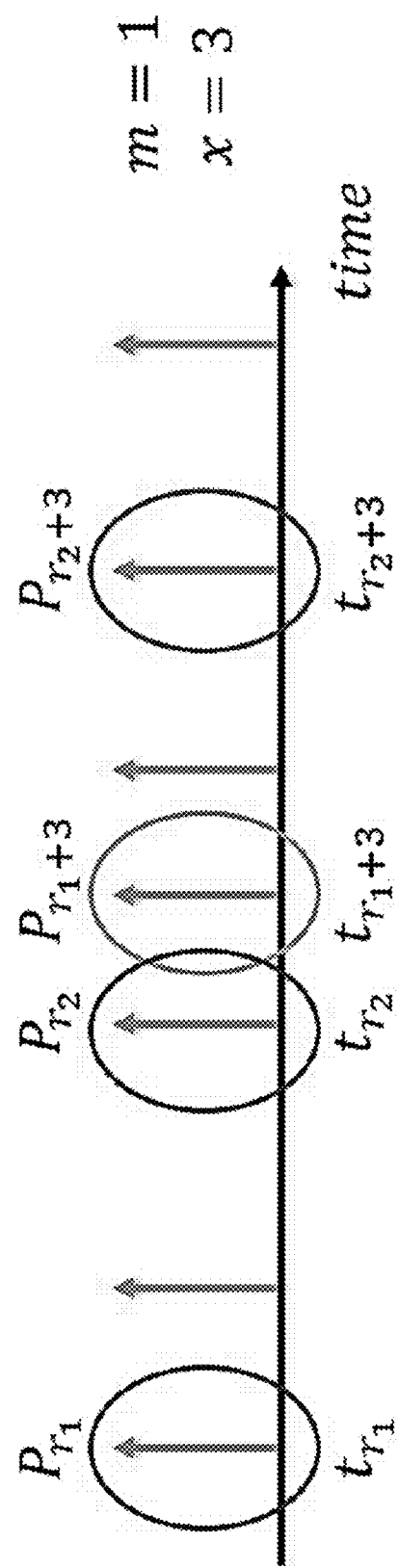
FIG. 6 shows a sample packet stream in the time domain with packet injection times in accordance with various embodiments of the present disclosure.

To further explain this concept, FIG. 6 shows a sample packet stream in the time domain with packet injection times (with m=1 and x=3). For ease of explanation in this example, m is set to one and therefore, two packets (2m) are selected from the packet stream ($P_{r_1}$ and $P_{r_2}$). Both packets are paired with two other packets that are x (=3) packets away in the packet stream ($P_{r_1}$ with $P_{r_1+3}$ and $P_{r_2}$ with $P_{r_2+3}$). The IPD between each pair is calculated as $\tau_{r_1}=t_{r_1+3}-t_{r_1}$ and $\tau_{r_2}=t_{r_2+3}-t_{r_2}$. The two IPD values are then divided into two groups and $\Delta$ calculated according to Equation 3 as $$\frac{\tau_{r_1} - \tau_{r_2}}{2}$$

Figure 7:
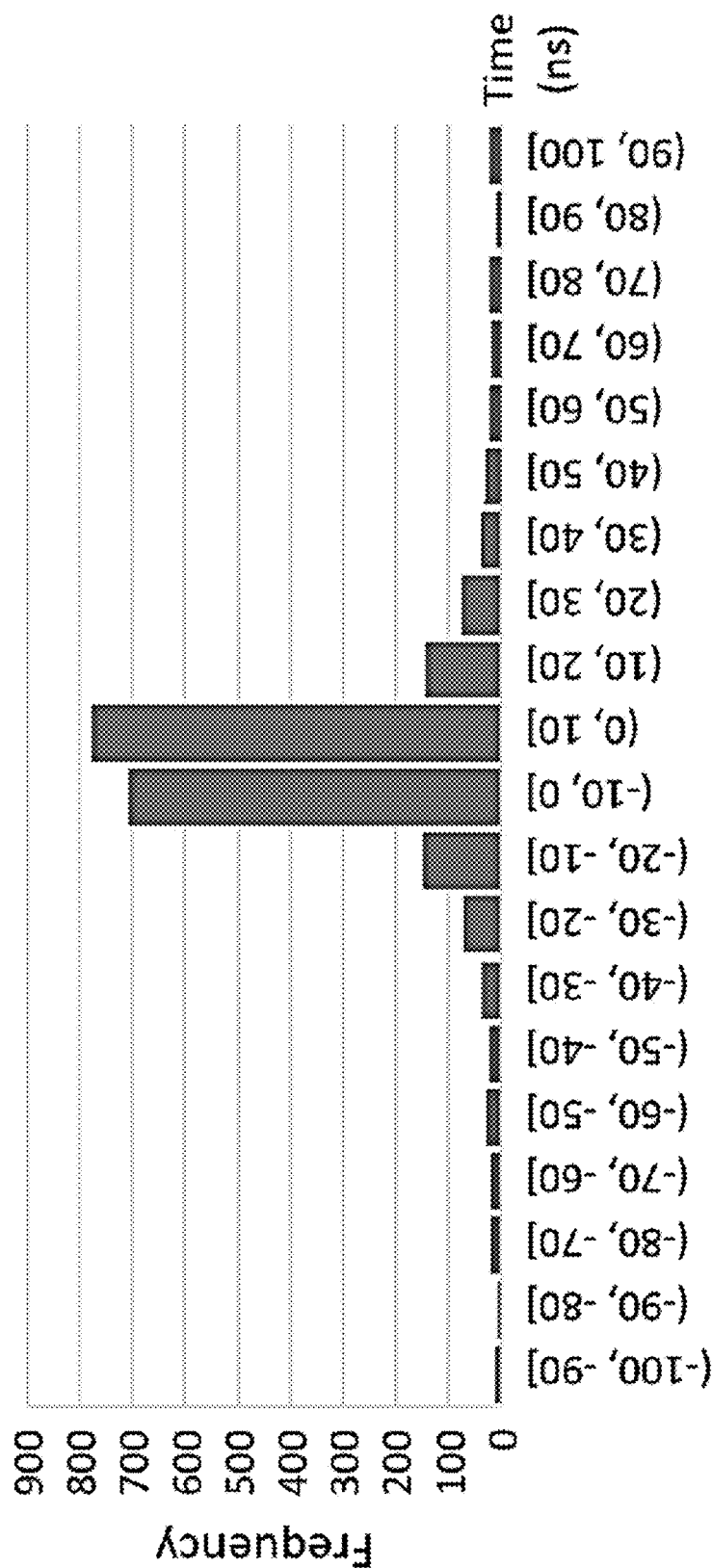
FIG. 7 shows a histogram distribution of the average difference between inter-packet delay in accordance with various embodiments of the present disclosure.

(sum for all m and division by m not shown since m=1). The process is repeated using a packet stream that had more than 3000 packets obtained by running a simulation using the gem5 architectural simulator on a real benchmark. An 8×8 Mesh NoC was modelled using the Garnet2.0 interconnection network model. The node in the top left corner (node S) ran the RADIX benchmark from the SPLASH-2 benchmark suite. One memory controller was modelled and attached to the node in the bottom right corner (node D) so that the memory requests always traverse from S to D. FIG. 7 shows the histogram collected at the NI of S for the distribution of $\Delta$ with m=1 and x=3. Packets were collected at random with the above parameter values to plot $\Delta$. One can observe from FIG. 7 that the distribution closely approximates the distribution we expected. The calculated sample mean ($\mathbb{E}[\Delta]$) for this particular example was 0.0053, which is very close to zero. Increasing the number of selected packets (2m) further increases the likelihood of the sample mean being zero.

An exemplary watermarking scheme includes a shared secret between S and D, which is "hard" for any other node to guess or deduce. In addition, several parameters are shared between S and D. Specifically, S and D share the tuple $<m, \alpha, w_{SD}, \mathbb{K}>$. The first three parameters have been previously discussed as the sample size (m), the shift amount ($\alpha$), and the unique watermark that represents $P_{SD}(w_{SD})$. The length of $w_{SD}(w)$ can be derived from $w_{SD}$. In addition, $\mathbb{K}$ is a secret which is used to derive a key for the encryption scheme and a seed $\mathbb{S}$ using a key derivation function. $\mathbb{S}$ is used to seed the pseudo-random number generator which selects the 2m IPDs. It is assumed the attacker does not know $w_{SD}$ or $\mathbb{K}$, but may know m and $\alpha$.

When the watermark encoder, which is integrated in the NI of node S, receives packets from its local IP with the destination node D, the watermark encoder encodes the watermark according to the shared secret between S and D. The selection of the IPDs that construct the $\Delta$ distribution needs to be deterministic so that the selection process is identical for the watermark encoder and decoder and cannot be replicated by an attacker. To achieve this, a method is needed to pair packets deterministically based on the shared secret and also appear uniformly random to the attacker (who does not know the shared secret). In accordance with various embodiments, a pseudo-random number generator (PRNG) seeded (i.e., initialized) with $\mathbb{S}$ (or something derived from it) is utilized to achieve these objectives, which acts to ensure that the encoder and decoder produce the same sequence of random numbers and an attacker (who does not know the seed) cannot predict the next PRNG output, even with the knowledge of the previous output.

Let $\mathcal{F}$ denote the selection function, that given a packet stream, selects and divides 2m IPDs into two groups, each of size m. Next, a window of packets is chosen, and two random packets are paired together from each window. Therefore, to construct 2m IPDs, 2m such packet windows are required. The operation of $\mathcal{F}$ used in an exemplary method is outlined in Algorithm 1 (below). The PRNG seeded with $\mathbb{S}$ is used to randomly generate two integers $r_z$ and x (line 1) such that $0 \leq r_z \leq W-1$ and $0<x$ and $r_z+x \leq W-1$, where W is the size of the window. This can be done using rejection sampling to ensure that $r_z \neq x$ and then calling the smaller integer $r_z$ and the larger $r_z+x$. The packet at the index $r_z(p_{r_z})$ is paired with the packet that is x packets away giving the random pair $\{p_{r_z}, p_{r_z+x}\}$ (lines 4-5). The calculated IPD values are then evenly divided into two groups (lines 6-11).

---

Algorithm 1 - Selection Function $\mathcal{F}$

Input: Seed $\mathbb{S}$
Output: Two IPD groups used to encode one watermark bit
Procedure: $\mathcal{F}$
1: $r_z$, x ← PRNG($\mathbb{S}$)
2: for all k = 1, ..., 2m do
3:    A ← selectNextWindow($P_{SD}$)
4:    $p_{r_z}$ ← A[$r_z$]
5:    $p_{r_z+x}$ ← A[$r_z$ + x]
6:    $\tau_{r_z}$ ← $t_{r_z+x}$ - $t_{r_z}$
7:    if k is odd then
8:       $\tau^1_k$ ← $\tau_{r_z}$
9:    else
10:      $\tau^2_k$ ← $\tau_{r_z}$
11: return [$\{\tau^1_1, \tau^1_2, ..., \tau^1_m\}, \{\tau^2_1, \tau^2_2, ..., \tau^2_m\}$]

---

Since 2m IPDs are required to encode a 1-bit watermark, w iterations of the procedure $\mathcal{F}$ are required to encode the w-bit watermark. When encoding one watermark bit, the distribution of $\Delta$ holds only when each pair of packets is the same distance x apart from each other. Therefore, the same $r_z$ and x values are used for each iteration of k. When encoding another watermark bit, another iteration of $\mathcal{F}$ is required in which another pair of $r_z$ and x values will be generated by the PRNG. To ensure that the same $r_z$ and x values are not generated for subsequent watermark bits, the PRNG must be seeded only once.

Node D upon examining the packet stream $P_{SD}$, decodes the w-bit watermark $w'_{SD}$ using the shared secret tuple. The decoder concludes that the watermark is valid if the Hamming distance between $w_{SD}$ (taken from the shared secret tuple) and $w'_{SD}$ (decoded from the received packet stream $P_{SD}$ is less than or equal to the error margin $\delta$. Formally, the watermark is valid if:

$$\mathcal{D}_{(w_{SD}, w'_{SD})} \leq \delta \qquad (4)$$

where $\mathcal{D}$ is the Hamming distance between two bit strings and $0 \leq \delta \leq w$. The reason for allowing an error margin $\delta$ and not looking for an exact match is that no matter how large the shift amount $\alpha$ is, there is a probability that the watermark is decoded incorrectly. Tuning parameter $\delta$ allows us to minimize this probability and allows us to minimize the impact of the attack.

The watermark encoder and decoder operation relies on shared secret tuples between nodes to make sure the watermarking scheme cannot be compromised. To facilitate this, an efficient way to generate and manage such secrets is required. Previous studies have addressed the problem of developing an efficient management mechanism. One such example is the key management system proposed by Lebiednik et al. See B. Lebiednik et al., "Architecting a Secure Wireless Network-on-Chip," in Twelfth IEEE/ACM International Symposium on Networks-on-Chip (NOCS), 2018, pp. 1-8. In their work, a separate IP called the key distribution center (KDC) handles the distribution of keys. Each node in the network negotiates a new key with the KDC using a pre-shared portion of memory that is known by only the KDC and the corresponding node. The node then communicates with the KDC using this unique key whenever it wants to obtain a new key. The KDC can then allocate keys and inform other nodes as required. An exemplary digital watermark detection system and method of the present disclosure can be integrated with a similar key generation and management mechanism.

Given this watermark encoding/decoding scheme, it is clear that larger the shift amount $\alpha$ is, the higher the bit decoding success rate (BDSR) will be. However, having arbitrarily large $\alpha$ is not feasible in systems with real-time constraints. As previously discussed, a watermark bit can be decoded incorrectly if at the receiver's end, $|\Delta| > \alpha$. Therefore, the behavior of $Pr[|\Delta| > \alpha]$ should be analyzed. There are several well-established statistical tools for this, but in particular concentration results can be used, also known as tail bounds. Since the IPDs are bounded and independent, Hoeffding's inequality can be used and equations related to the distribution of $\Delta$:

$$Pr[|\Delta| \geq \alpha] \leq e^{\left(-\frac{m\alpha^2}{2\sigma^2}\right)}.$$

Using symmetry:

$$Pr[\Delta < \alpha] \geq 1 - \frac{1}{2} e^{\left(-\frac{m\alpha^2}{2\sigma^2}\right)}. \qquad (5)$$

Therefore, one can observe that the BDSR is lower bounded by a value that depends on $\alpha$ and m. The results show that irrespective of the distribution of the IPDs, for arbitrarily small $\alpha$ values, we can always take the BDSR close to 100% by increasing the sample size m. In other words, no matter how small the shift amount $\alpha$ needs to be to abide by the timing constraints of the system, we can still achieve high BDSR by selecting more packets in each IPD group.

Having established mathematical guarantees about BDSR during normal operation, our focus is shifted to explore how BDSR of legitimate packet streams can be affected by an attack. According to the threat model, the Trojan infected router copies packets and sends them to a malicious application running on a different IP. As a result, more packets are introduced to the network which can cause congestion. All packets in the network can be delayed because of this. Therefore, the attack can introduce additional delays to the legitimate packet streams. It is safe to assume that these additional delays are finite. If the attacker delays packets indefinitely through congestion, the attack is no longer an eavesdropping attack, but rather a flooding type of denial-of-service attack.

Given that the Trojan-infected router does not know which packets were selected by the watermark encoder, the delay introduced by the attacker (whatever it is) on the selected IPDs is IID from the perspective of S and D. Using this insight, $\Delta'$ can be analyzed, which is the distribution after modifying $\Delta$ defined in Equation 3 with the added delays, and conclude that:

$$Pr[\Delta' < \alpha] \geq 1 - \frac{1}{2} e^{\left(-\frac{m\alpha^2}{2(\sigma+\sigma_d)^2}\right)} \qquad (6)$$

where $\sigma_d$ is the added delay variance due to the added congestion. Observe that the only change is the increase in variance caused by the attacker. We can choose $\sigma_d$ depending on the amount of congestion the attacker is willing to cause without risking being detected. Similar to the argument made when reasoning about the BDSR using Equation 5, one can see that BDSR is lower bounded and by manipulating the sample size, the BDSR can be made arbitrarily close to 100%. Therefore, the impact on the watermarking detection is a bounded increase of variance on an otherwise 100% successful watermarking scheme. As the illustrative example that calculates BDSR outlines, the success rate can be brought very close to 100% even with the selection of a modest value for m.

As previously discussed, the use of the error margin $\delta$ instead of an exact match between the decoded and the expected watermark, allows us to tune $\delta$ to maximize the watermark detection success rate (WDSR). Unlike BDSR, which refers to the success of decoding a single bit, WDSR considers the entire watermark with w bits. The probabilistic nature of the exemplary digital watermark detection scheme leaves a small probability that the watermark will be incorrectly decoded irrespective of the values chosen for the parameters. While this probability is small, efficient selection of $\delta$ can push WDSR as close as possible to 100%. On the other hand, using a larger error margin also increases the success of potential attacks. Indeed, assuming that the attacker is aware of an exemplary detection strategy, the best strategy for an attacker to eavesdrop on data without being detected is to try to forge a watermark. If the attacker succeeds, then the duplicated packets will be accepted as valid by the node that runs the accomplice application and the watermarking-based defense will be defeated. The success probability of such a forging attack is referred to as the watermark forging success probability (WFSP). The goal of the detection scheme is thus to set the parameters such that WDSR is maximized while minimizing WFSP.

The probability of incorrectly decoding a bit was formalized using the metric BDSR as $Pr[|\Delta|>\alpha]$. Considering symmetry, let $\vartheta=Pr[-\infty<\Delta<\alpha]=Pr[-\alpha<\Delta<\infty]$. Then for a w-bit watermark, probability of accurately decoding all w bits will be $\vartheta^w$. Therefore, the expected WDSR can be calculated as:

$$\sum_{i=0}^{\delta} \binom{w}{i} \vartheta^{w-i}(1-\vartheta)^i \quad (7)$$

We can see that with a large $\delta$, the expected WDSR increases. We observe from Equation 7 that:

$$\sum_{i=0}^{\delta} \binom{w}{i} \vartheta^{w-i}(1-\vartheta)^i \geq \vartheta^w.$$

Therefore, the expected WDSR can be made larger than the desired WDSR by increasing $\vartheta$. Revisiting Equation 6, we observe that $\vartheta$ can be made sufficiently close to 1 by increasing the sample size m irrespective of $\alpha$, $\sigma$, and $\sigma_d$. Therefore, one can conclude that in theory, it is possible to make WDSR close to 100% even with a modest error margin.

While increasing $\delta$ can increase WDSR, the larger the $\delta$, the larger the expected WFSP will be. This can be addressed in two steps. First, watermarks can be selected such that under a given error margin $\delta$, the probability that one watermark can be incorrectly decoded as another watermark (watermark collision) is minimized. Next, the case where an attacker after knowing an exemplary detection mechanism tries to inject duplicated packets is considered, such that the decoder at the receiver incorrectly validates the watermark (watermark forging) and accepts the duplicated packet steam as valid.

The problem of selecting distinct w-bit watermarks for each source-destination pair can be recast as the problem of selecting distinct codewords, which is a well-established problem that has been extensively studied in the information theory literature. Indeed, it is known that for any given set of distinct codewords, if the minimum Hamming distance between any two codewords is at least $2\delta+1$, a nearest neighbor decoder will always decode correctly when there are $\delta$ or fewer errors. Therefore, if the watermarks are chosen such that any two watermarks are at least $2\delta+1$ distance apart, the probability of a watermark collision is minimal. The number of bits in the watermark w are selected such that this property is satisfied.

Even if w is selected such that watermark collision probability is minimized, an attacker may still try to impersonate a legitimate sender. Let's assume that $w_{SD}$ and $w_{SY}$ are valid watermarks with distance $2\delta+1$ (minimum possible distance between two watermarks) between nodes S and D and S and Y, respectively. A Trojan-infected router in the path from S to D duplicates packets and sends the duplicate packets to an accomplice application in node Y. For Y to accept the duplicated packet stream as a legitimate packet stream coming from S, the watermark of the duplicated packet stream should match $w_{SY}$. This type of attack is referred to as a watermark forging attack.

In accordance with the present disclosure, watermarks are kept unknown to any other parties, except for the sender and receiver in a packet stream, using shared secrets. Therefore, the attacker's method to forge a watermark can be reduced to a random bit flipping game with the goal of matching $w_{SY}$. Random bit flipping is achieved by randomly delaying the duplicated packets in $P_{SD}$. For the attacker to win the game, $w_{SD}$ should change to $w_{SY}$. Since the minimum distance between any two watermarks is $2\delta+1$, considering the error margin of $\delta$, the minimum required number of bit flips is $\delta+1$. Therefore, the attacker should flip at least $\delta+1$ bits to win the game. However, flipping the wrong bits can take the target even further. Therefore, the best chance for the attacker to win the game is if it flips the correct $\delta+1$ bits of $w_{SD}$ to match $w_{SY}$ to end up within the error-margin of $w_{SY}$, i.e., within $\delta$-Hamming distance of $w_{SY}$. The probability that the attacker flips the correct $\delta+1$ bits at any given round of the game is thus:

$$\binom{w}{\delta+1}^{-1}.$$

Assuming the attacker plays n times, the attacker's probability of winning, or in other words, the probability of successfully forging the watermark (WFSP) at least once (after n attempts) is:

$$1 - \left[1 - \frac{1}{\binom{w}{\delta+1}}\right]^n \quad (8)$$

It is observed that by manipulating w and $\delta$, this probability can be made arbitrarily small. Furthermore, n cannot be arbitrarily large because if the probability of winning in the first few attempts is low, then the attacker will be detected before the attacker can successfully forge the watermark, which allows us to conclude that WDSR can be made close to 100% and WFSP can be made close to 0%. The combination of Equations 6, 7, and 8 give us the theoretical trade-off model between WDSR and WFSP. However, one cannot accommodate arbitrarily large m and w in practical scenarios.

Figure 8:
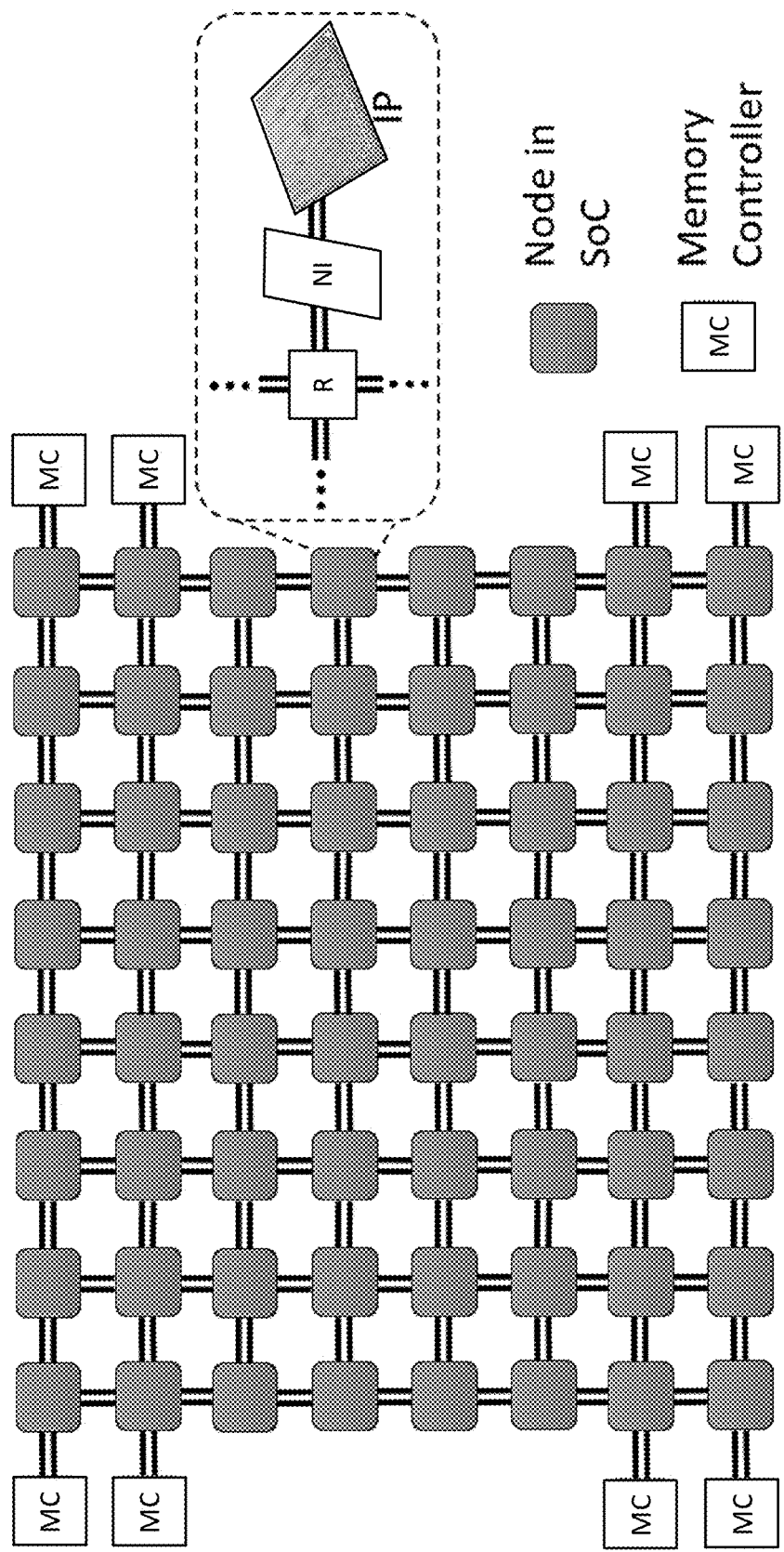
FIG. 8 shows an overview of an NoC-based System-on-Chip (SoC) model that is used to test an exemplary digital watermark detection system in accordance with embodiments of the present disclosure.

An exemplary approach is evaluated by modeling an NoC-based SoC using a cycle-accurate full-system simulator—gem5. Specifically, a "GARNET2.0" interconnection network model that is integrated with gem5 was used to model an 8×8 Mesh 2D NoC. To ensure the accuracy of an exemplary simulator model when compared to real hardware, the simulator framework proposed by Charles et al., which has validated simulator results with results from the Intel Knights Landing (KNL) architecture (Xeon Phi 7210 hardware platform) was used when setting up the experimental environment. See Charles et al., "Exploration of Memory and Cluster Modes in Directory-Based Many-Core CMPs," in Twelfth IEEE/ACM International Symposium on Networks-on-Chip (NOCS), 2018, pp. 1-8. FIG. 8 shows an overview of the NoC-based SoC model, where each IP was modeled as a processor core executing a given task at 1 GHz with a private L1 Cache and eight memory controllers were modeled and attached to the IPs in the boundary providing the interface to off-chip memory. In case of a cache miss, the memory request/response messages were sent to/from memory controllers as NoC packets. Additionally, the NoC was modeled with 3-stage (buffer write, route compute+virtual channel allocation+switch allocation, and link traversal) pipelined routers with wormhole switching and 4 virtual channel buffers at each input port. Packets are routed using the deadlock and livelock free, hop-by-hop, turn-based XY deterministic routing protocol.

Each processor core in the SoC was assigned an instance out of FFT, RADIX (RDX), FFM and LU benchmarks from the SPLASH-2 benchmark suite. Each simulation round can in theory, give $$\binom{64}{2} \times 2 = 4032$$

packet streams (assuming two-way communication between any pair out of the 64 nodes) and the number of iterations that depended on the number of benchmarks (four in the present case) can give $$4 \times \binom{64}{2} \times 2 = 16{,}128$$

packet streams. However, depending on the address mapping, only some node pairs out of all the possible node pairs communicate. Present simulations generated 3072 packet streams for all benchmarks between 1024 unique node pairs which were used to evaluate an exemplary method. However, to decide the number of bits in the watermark w, looking at only the number of unique node pairs is not sufficient because to avoid watermark collisions, the Hamming distance between any two watermarks should be at least $2\delta+1$. As $\delta$ increases, w increases as well. Therefore, more packets are required to encode the watermark and as a result, the time to detect an ongoing attack increases (more packets need to be observed before recognizing the watermark). Increasing m has a similar impact. Increasing $\alpha$ increases the application execution time resulting in an increase in time to detect eavesdropping attacks. This motivates us to explore optimum parameter (m, $\alpha$, and $\delta$) values such that WDSR is maximized and attack detection time, execution time, as well as WFSP are minimized.

Figure 9:
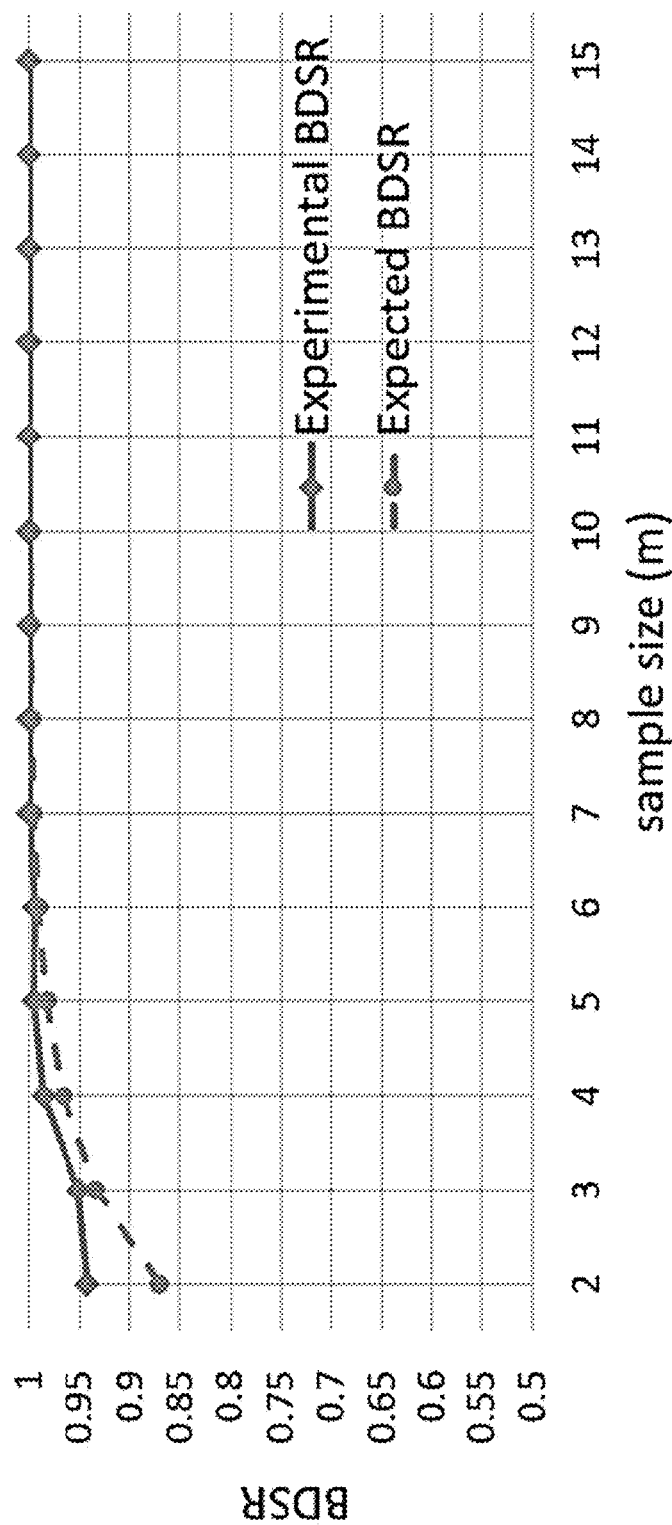
FIGS. 9 and 10 show comparisons of experimental bit decoding success rate (BDSR) with expected BDSR in accordance with various embodiments of the present disclosure.

When embedding one watermark bit in a packet stream, Equation 5 gives a theoretical estimate of the BDSR. To compare the theoretically expected BDSR with experimental results, a non-overlapping sliding window of $\lambda$ packets are used and 2m IPDs are selected, in which one bit is encoded in each of the 3072 selected packet steams and decoded at the receiver's side. $\lambda=8$ is chosen to ensure adequate randomness in the IPD selection process, $\alpha=60$ ns is kept fixed, and m is varied from 2 to 15. Results are shown in FIG. 9 from a comparison of the experimental BDSR outcome with the theoretical or expected model (Equation 5). For example, the expected BDSR for m=4, $\alpha=60$ ns and $\sigma^2=2662$ is calculated as:

$$Pr[\Delta < 60] \geq 1 - \frac{1}{2}e^{\left(-\frac{4 \times 60^2}{2 \times 2662}\right)} \approx 0.967.$$

Figure 10:
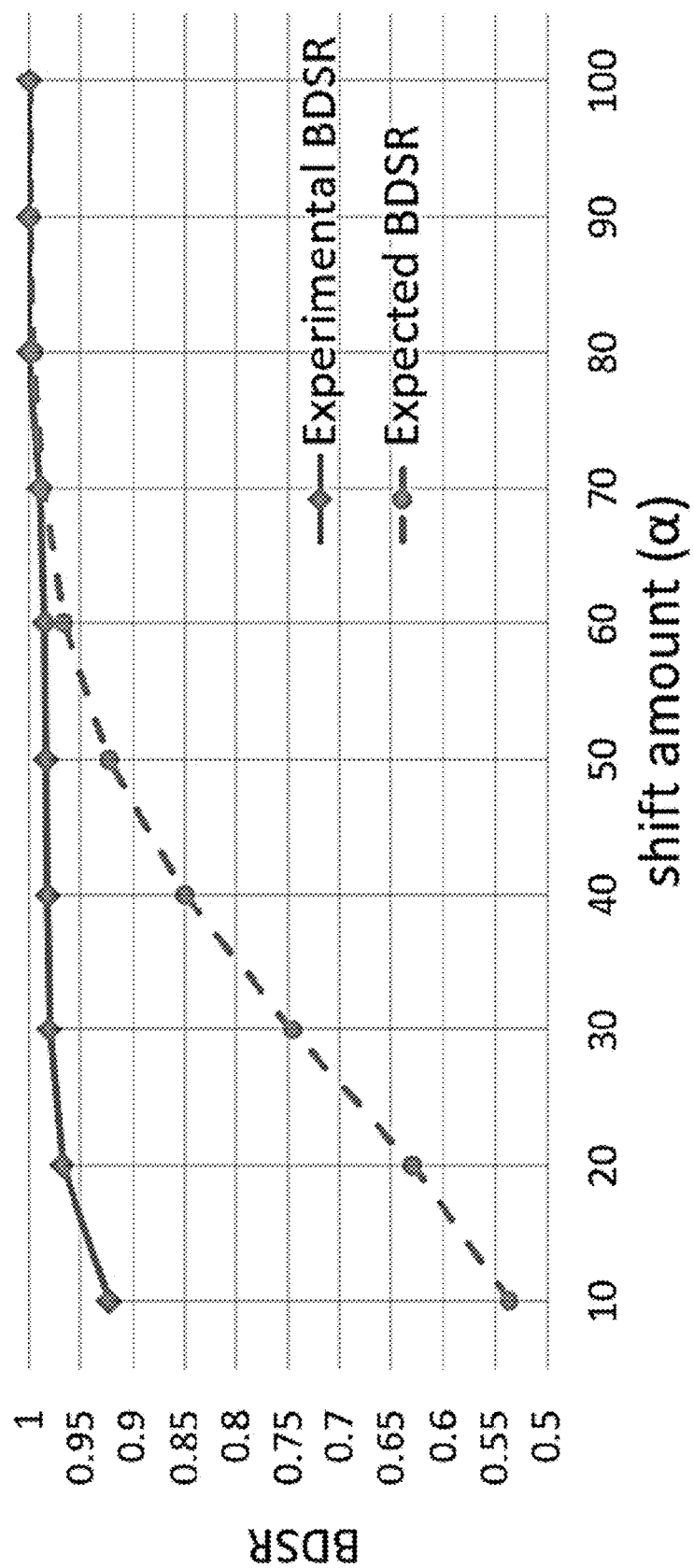

If we now fix m=4 and vary $\alpha$ from 10 ns to 100 ns to explore BDSR variation with $\alpha$, FIG. 10 shows the comparison between the theoretical model (Equation 5) and results generated from the present experiments. The experimental results in both FIGS. 9 and 10 show that the theoretical model gives an accurate bound on BDSR. As $\alpha$ and m are increased, BDSR converges to 1. However, the present goal is to detect any attack with high accuracy while incurring minimum performance overhead. Therefore, BDSR is not the only deciding factor. As $\alpha$ and m is increased, the execution time of the application/benchmark running with an exemplary digital watermark detection scheme increases as well. Thus, $\alpha$ and m should be chosen such that this trade-off is maintained.

While FIGS. 9 and 10 show how BDSR varies with m and $\alpha$, both figures had one parameter fixed while varying the other. To observe how both m and $\alpha$ effect the BDSR as well as the execution time, a grid search was performed in the ranges $2 \leq m \leq 10$, $2 \leq \alpha \leq 80$, and w=20, and cases were eliminated where the expected BDSR was less than 0.95 and the execution time increase was more than 5%. These thresholds were chosen to achieve the optimum balance in the trade-off. Results are shown in FIG. 11 that provides a comparison of BDSR and execution time variation with m and $\alpha$, where w is fixed at 20. In the figure, the top cells show expected BDSR, the middle cells show experimental BDSR and, the bottom cell show indicate execution time increase. Crosses (X) indicate either expected BDSR or execution time increase falling beyond selected thresholds.

As such, w was chosen to be 20 due to 10 bits being required to provide a unique watermark for each communicating node pair (1024 in the present experiments). 10 additional bits were also kept to allow error margins as well as to avoid collisions. However, w can be further optimized leading to a better execution time, in which execution time increase can be measured as the average execution time increase as a percentage when benchmarks are run with an exemplary approach compared to the Default-NoC. Out of the possible combinations in FIG. 11, m=4 and $\alpha=60$ were chosen as it gives an adequate trade-off for our exploration.

Figure 12:
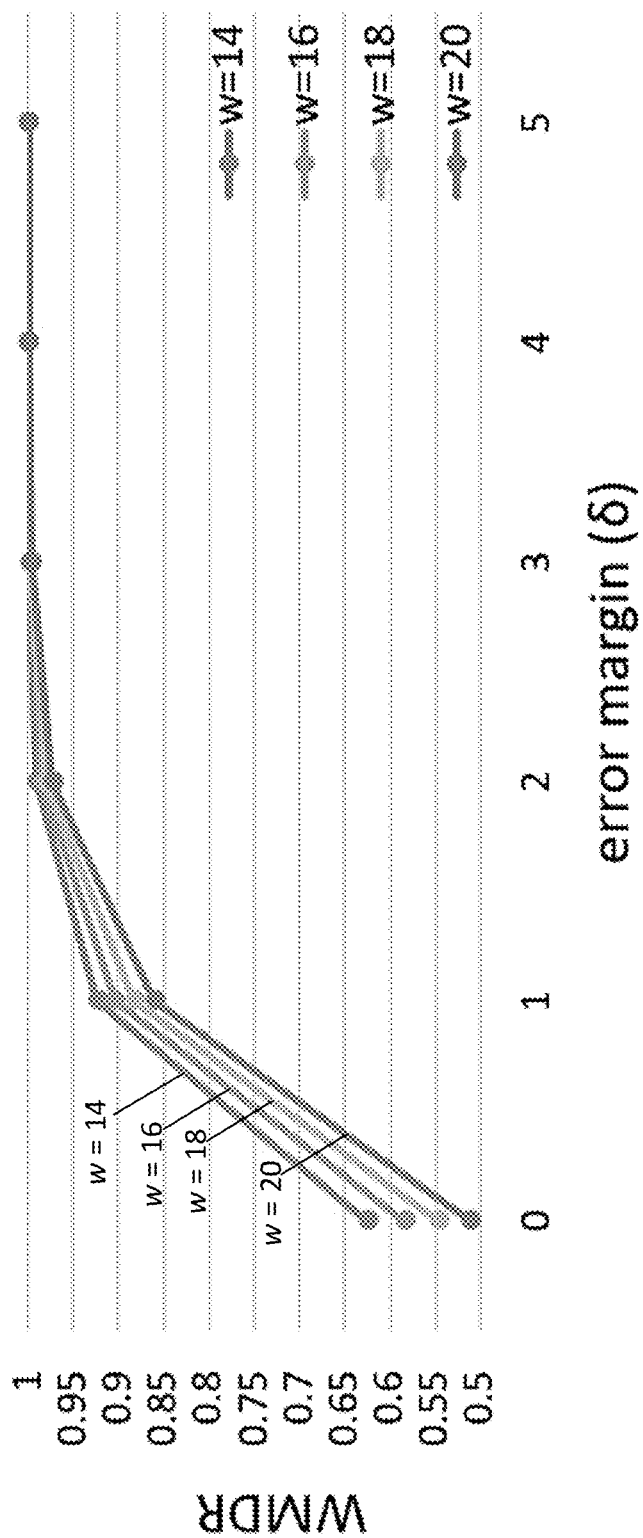
FIG. 12 shows experimental results for the expected watermark detection success rate (WDSR) variation versus error margin in accordance with various embodiments of the present disclosure.

With the values selected for m and $\alpha$, the impact of the error margin $\delta$ on WDSR is explored. To calculate the expected WDSR according to Equation 7, w should be decided. However, the value of w is dependent on the value we select for $\delta$. Therefore, the behavior of expected WDSR is explored with respect to $\delta$ for several fixed w values (w$\in$[14, 16, 18, 20)). Results are shown in FIG. 12 for the expected WDSR variation with error margin $\delta$ for several w values with m and $\alpha$ fixed at 4 and 60 ns, respectively. In the figure, $\delta=0$ represents exact matches between the decoded watermark and the expected watermark without using an error margin. The importance of using $\delta$ is evident when the scenario of looking for exact matches ($\delta=0$) is compared with any other $\delta$ value. For example, for the values $\vartheta=0.967$ and w=20, WDSR with exact matches is $\vartheta^w=51.1\%$ whereas for the same $\vartheta$ and w values with an error margin of 2, WDSR is 97.3%.

The chosen $\delta$ value affects the chances of the attacker succeeding in a forging attack (WFSP). To evaluate the impact, WDSR (Equation 7) and WFSP (Equation 8) are explored for different combinations of w and $\delta$. However not all w and $\delta$ values can co-exist if watermark collisions are to be avoided. If we assume that the chosen $\delta$ value is 2, they should be at least $2\delta+1(=5$ if $\delta=2)$ Hamming distance apart for two watermarks to not collide. Since there are 1024 unique node pairs, w can be set as the minimum number of bits required to generate 1024 unique codewords such that the minimum Hamming distance between any two codewords is 5. In other words, w is sought such that A(w, 5)≥1024. From the works of Best et al., we can derive w≥18. See M. Best et al., "Bounds for Binary Codes of Length Less than 25," IEEE Transactions on Information theory, vol. 24, no. 1, pp. 81-93, 1978. Therefore, to ensure that there are no collisions between watermarks with an error margin of 2, at least 18 bits are required for the watermark. Similarly, we can derive w≥21, for δ=3, and w≥14 for δ=1. Since increasing w has an impact on execution time as well, for each δ value, the two smallest possible w values are selected, such that there are no watermark collisions. Table II (below) shows expected WDSR, WFSP values, experimental WDSR values, and execution time increases for varying w and δ at $\vartheta$=0.967 and n=10. These results strongly support the claim that WFSP can be made arbitrarily small by manipulating w and δ. It is observed from FIG. 12 that WDSR converges to 1 starting with δ=2. Furthermore, by observing values in Table II, δ=2 and w=18 can be selected as a configuration that gives an adequate trade-off.

TABLE II

| δ | w | Expected WDSR | WFSP | Experimental WDSR | Execution Time Increase |
|---|---|---|---|---|---|
| 1 | 14 | 0.9238 | 0.1046 | 0.9538 | 3.49% |
| 1 | 15 | 0.9139 | 0.0912 | 0.9512 | 3.61% |
| 2 | 18 | 0.9797 | 0.0121 | 0.9801 | 3.95% |
| 2 | 19 | 0.9765 | 0.0102 | 0.97884 | 4.06% |
| 3 | 21 | 0.9955 | 0.0075 | 0.9987 | 4.29% |
| 3 | 22 | 0.9946 | 0.0064 | 0.9964 | 4.40% |

Figure 13A:
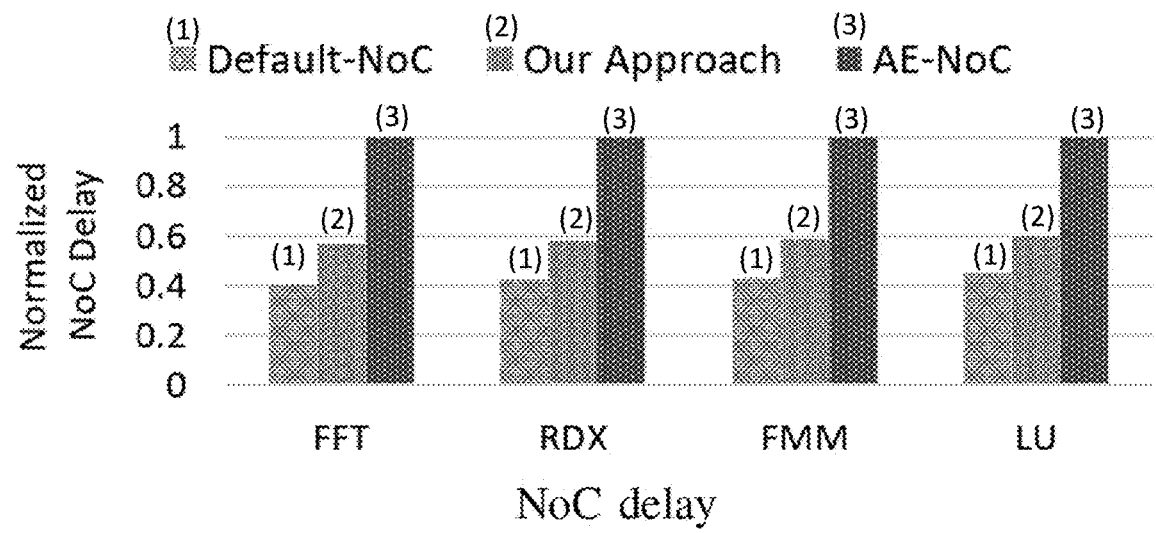
FIGS. 13A-13B show NoC delay and execution time comparisons for traditional authentication encryption based defenses and an exemplary digital watermark detection method in accordance with various embodiments of the present disclosure.
Figure 13B:
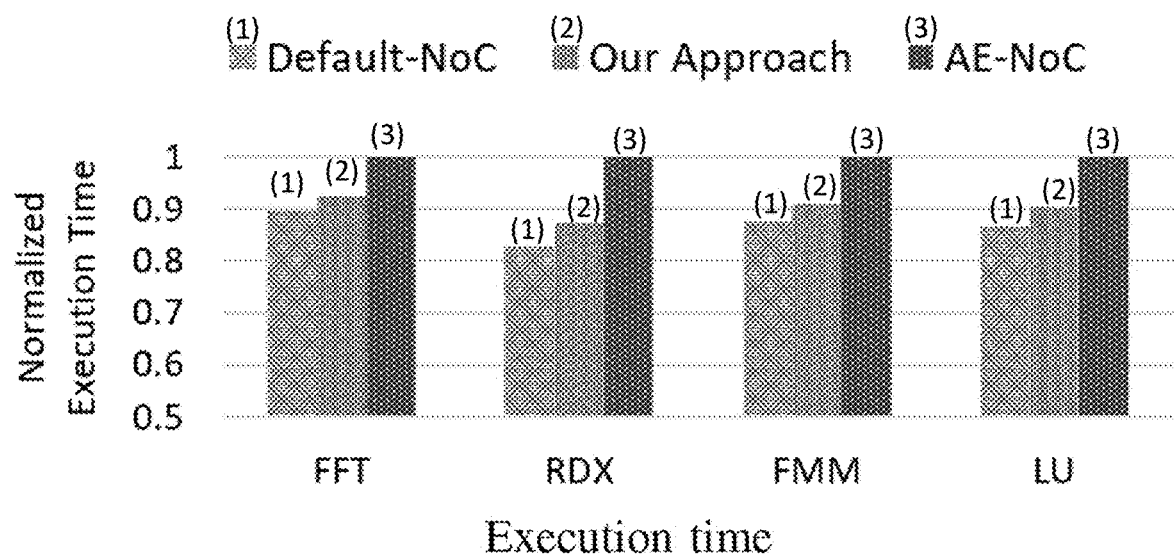

With the selected parameters, m=4, α=60, δ=2, w=18, the performance improvement achieved by an exemplary digital watermark detection method is compared to the traditional AE based defenses. Two scenarios—Default-NoC and AENoC—have been introduced in the present disclosure against which the performance of an exemplary digital watermark detection approach (also referred to as a digital watermarking-based attack detection coupled with encryption) is evaluated. NoC delay and execution time comparisons are shown in FIGS. 13A-13B for Default-NoC, AE-NoC, and an exemplary digital watermark detection method. The exemplary approach of the present disclosure only increases the NoC delay by 27.9% (26.3% on average) and execution time by 5.2% (3.95% on average) compared to the default NoC, whereas AE-NoC increased NoC delay by 59% (57% on average) and execution time by 17% (13% on average). Therefore, the exemplary digital watermark detection method has the ability to significantly improve performance compared to other state-of-the-art security mechanisms intended at preventing eavesdropping attacks.

In addition to execution time comparison, the time taken to detect an ongoing attack (detection time) is also critical. Detection time is calculated as the time taken to decode the complete watermark from a packet stream. As soon as the w-bit watermark is decoded and validated, any eavesdropping attack can be detected. Table III (below) shows attack detection times for different applications/benchmarks normalized to the corresponding benchmark execution time, which shows that an exemplary digital watermark detection scheme is capable of detecting any eavesdropping attacks in a timely manner.

TABLE III

| FFT | RDX | FMM | LU |
|---|---|---|---|
| 6.56E-3 | 4.8E-5 | 1.9E-4 | 3.9E-4 |

In summary, these results validate the theoretical model of the present disclosure and provide a framework to tune the parameters such that eavesdropping attacks can be detected quickly with high accuracy while providing a significant performance improvement compared to existing state-of-the-art solutions.

In various embodiments, the security of the watermarking scheme depends on the secrecy of some parameters. Parameters include the watermark $w_{SD}$ as well as the key $\mathbb{K}$ for each $P_{SD}$. In various embodiments, a key distribution center (KDC) acts as a trusted dealer to distribute these parameters. In the absence of a trusted dealer, each communicating node pair will have to agree on a watermark and a key. While this can be facilitated by key-exchange protocols such as the Diffie-Hellman key exchange, the lack of a trusted dealer can cause duplicated watermarks (watermark collisions). If watermarks are selected uniformly at random to minimize the chances of collision, according to a birthday bound, the number of bits assigned to the watermark should be double of what is required. For example, if an 18-bit watermark is required in the presence of a trusted dealer, 36 bits are required in its absence because of the birthday bound. While an exemplary digital watermark detection scheme of the present disclosure can give better accuracy and less collisions for a 36-bit watermark, the execution time as well as the detection time will increase. Therefore, a designer should carefully select the size of the watermark to minimize the collision without violating the performance budget.

It is important to note that the watermark is encoded in the IPD values, not in the individual packet injection/received times. Furthermore, packet injection times can vary depending on the behavior of the application as well. There can be phases in the application execution where more packets are injected to the NoC whereas in some other phases, delay between packet injections is comparatively high. Therefore, "guessing" the watermark cannot be easily accomplished by merely observing packet arrival times. Moreover, the only way for an attacker to forge the watermark successfully is to know both the watermark and the PRNG seed. Indeed, even if the watermark could be inferred from packet timing, the PRNG seed cannot be inferred from packet timing information due to cryptographic guarantees of using a PRNG.

If we assume that the attacker knows the watermark, but not the PRNG seed, the attacker must select the two correct packets (that forms the IPD) from each window to forge the watermark. Without the PRNG seed, the attacker's probability of correctly guessing the two packets from a given window is $$1 \Big/ \binom{\lambda}{2}. \qquad \text{(Case I)}$$

Similarly, we can derive that the probability of two packets chosen by the attacker partially overlapping with the correct two packets and the probability of the attacker not selecting either one of the two correct packets are $$2(\lambda - 2) \Big/ \binom{\lambda}{2} \text{ and} \qquad \text{(Case II)}$$

-continued $$\binom{\lambda-2}{2}/\binom{\lambda}{2}, \quad \text{(Case III)}$$

respectively. Therefore, the higher the value chosen for λ means the lower the chances of a successful attack. For example, the probability of the attacker not selecting either one of the two packets correctly (Case III) goes above 0.5 at λ=8. In the overlapping scenario, if the first packet selected by the attacker is the correct second packet (or vice versa), delaying it will give the incorrect watermark bit. However, to give a conservative estimate, that possibility is ignored and λ=8 is used so that the probability of selecting both packets incorrectly is at least ½. This analysis shows that an exemplary digital watermark detection system/method of the present disclosure can be tuned to work even in scenarios with very strong security assumptions such as the watermark being leaked to the attacker. Additionally, for systems which require even stronger security, another layer of security can be added if the watermark assigned between each pair of nodes is rotated after some number of iterations.

In brief, the present disclosure introduces a lightweight eavesdropping attack detection mechanism using digital watermarking in NoC-based SoCs in accordance with various embodiments. As discussed, the present disclosure considers a widely explored threat model in on-chip communication architectures, where a hardware Trojan-infected router in the NoC IP copies packets passing through the router and re-routes the duplicated packets to an accompanying malicious application running on another IP in an attempt to leak information. Compared to existing authenticated encryption based methods, an exemplary digital watermark detection approach offers significant performance improvement while providing required security guarantees. Performance improvement is achieved by replacing authentication with packet watermarking that can detect duplicated packet streams at the network interface of the receiver. The accuracy and security of such an approach has been evaluated using theoretical models and empirically validated. Experimental results demonstrated that an exemplary digital watermark detection approach, in accordance with embodiments of the present disclosure, can significantly outperform the state-of-the-art methods.

In various embodiments, an exemplary digital watermark detection system includes a plurality of intellectual property cores integrated on a system-on-chip, such that the plurality of intellectual property cores comprise a first intellectual property core (e.g., source S (FIG. 4)) and a second intellectual property core (e.g., destination D (FIG. 4). The system further includes a first network interface (e.g., NI (FIG. 4)) integrated on the system-on-chip and connected to the first intellectual property core, wherein the first network interface is configured to encode a first digital watermark into a packet stream designated for the second intellectual property core; and a second network interface (e.g., NI (FIG. 4)) integrated on the system-on-chip and connected to the second intellectual property core, wherein the second network interface is configured to receive the packet stream transmitted from the first network interface and to decode the packet stream to generate a second digital watermark. The second network interface can be configured to perform a validation test on the packet stream and deliver the packet stream to the second intellectual property core when the first digital watermark is determined to match the second digital watermark. Additionally, the second network interface can be configured to invalidate the packet stream and generate a warning of a network attack when the first digital watermark is determined to not match the second digital watermark, wherein the network attack can comprise an eavesdropping attack.

The present disclosure can also be viewed as providing exemplary digital watermark detection methods. One such method comprises providing a plurality of intellectual property cores integrated on a system-on-chip, the plurality of intellectual property cores comprising a first intellectual property core and a second intellectual property core; encoding, by a first network interface integrated on the system-on-chip and connected to the first intellectual property core, a first digital watermark into a packet stream designated for the second intellectual property core; and receiving, by a second network interface integrated on the system-on-chip and connected to the second intellectual property core, the packet stream transmitted from the first network interface. The method further includes decoding, by the second network interface, the packet stream to generate a second digital watermark; testing, by the second network interface, validation of the packet stream based on the second digital watermark; validating, by the second network interface, the packet stream when the first digital watermark is determined to match the second digital watermark, and/or invalidating, by the second network interface, the packet stream when the first digital watermark is determined to not match the second digital watermark.

In one or more aspects of an exemplary system/method, the first network interface can be further configured to encrypt the packet stream before encoding the first digital watermark into the packet stream, wherein the second network interface is further configured to decrypt the packet stream after the packet stream is decoded to generate the second digital watermark and the second digital watermark is determined to match the first digital watermark. In one or more aspects, the first digital watermark can be encoded into the packet stream based on timing information, wherein the first digital watermark is a bit string embedded in the packet stream by intentionally delaying a set of packets to a shift a distribution of the packets by a defined shift amount representing watermark bits in the timing information of the packets, wherein the second network interface is configured to generate a bit string representing the second digital watermark based on calculated delays associated with the set of packets in the packet stream, wherein the second digital watermark is determined to match the first digital watermark when a Hamming distance between the first digital watermark and the second digital watermark is less than a defined error margin, wherein the set of packets are selected by the first network interface using a pseudo-random number generator, wherein the first intellectual property core and the second intellectual property core share as a secret a size of the set of packets, the defined shift amount, an encryption key, and a seed for the pseudo-random number generator that selects the set of packets, and/or wherein the size of the set of packets, the defined shift amount, and the defined error margin are tunable.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

Therefore, at least the following is claimed:
1. A method comprising:
providing a plurality of intellectual property cores integrated on a system-on-chip, the plurality of intellectual property cores comprising a first intellectual property core and a second intellectual property core that maintain a shared secret code;
encoding, by a first network interface integrated on the system-on-chip and connected to the first intellectual property core, a first digital watermark into a packet stream designated for the second intellectual property core, wherein:
the first digital watermark is based on the shared secret code and is encoded into the packet stream based on timing information;
the first digital watermark is a bit string embedded in the packet stream by intentionally delaying a set of packets to shift a distribution of the packets by a defined shift amount representing watermark bits in the timing information of the packets;
the set of packets are selected by the first network interface using a pseudo-random number generator; and
the first intellectual property core and the second intellectual property core share as a secret a size of the set of packets, the defined shift amount, an encryption key, and a seed for the pseudo-random number generator that selects the set of packets;
receiving, by a second network interface integrated on the system-on-chip and connected to the second intellectual property core, the packet stream transmitted from the first network interface;
decoding, by the second network interface, the packet stream to generate a second digital watermark;
testing, by the second network interface, validation of the packet stream based on the second digital watermark;
validating, by the second network interface, the packet stream when the first digital watermark is determined to match the second digital watermark;
invalidating, by the second network interface, the packet stream when the first digital watermark is determined to not match the second digital watermark; and
generating, by the second network interface, a warning that the system-on-chip is under an eavesdropping network attack.

2. The method of claim 1, wherein the second digital watermark is determined to match the first digital watermark when a Hamming distance between the first digital watermark and the second digital watermark is less than a defined error margin.

3. The method of claim 2, wherein the size of the set of packets, the defined shift amount, and the defined error margin are tunable.

4. The method of claim 1, further comprising encrypting, by the first network interface, the packet stream before encoding the first digital watermark into the packet stream; and
decrypting, by the second network interface, the packet stream after the packet stream is decoded to generate the second digital watermark and the second digital watermark is determined to match the first digital watermark.

5. The method of claim 1, wherein the second network interface generates a bit string representing the second digital watermark based on calculated delays associated with the set of packets in the packet stream.

6. The method of claim 5, wherein the second digital watermark is determined to match the first digital watermark when a Hamming distance between the first digital watermark and the second digital watermark is less than a defined error margin.

7. A system comprising:
a plurality of hardware intellectual property cores integrated on a system-on-chip, the plurality of hardware intellectual property cores comprising a first intellectual property core and a second intellectual property core that maintain a shared secret code;
a first network interface integrated on the system-on-chip and connected to the first intellectual property core, wherein the first network interface is configured to encode a first digital watermark into a packet stream designated for the second intellectual property core, wherein the first digital watermark is based on the shared secret code maintained between the first intellectual property core and the second intellectual property core, wherein:
the first digital watermark is encoded into the packet stream based on timing information;
a bit string is embedded in the packet stream by intentionally delaying a set of packets to shift a distribution of the packets by a defined shift amount representing watermark bits in the timing information of the packets;
the set of packets are selected by the first network interface using a pseudo-random number generator; and
the first intellectual property core and the second intellectual property core share as a secret a size of the set of packets, the defined shift amount, an encryption key, and a seed for the pseudo-random number generator that selects the set of packets; and
a second network interface integrated on the system-on-chip and connected to the second intellectual property core, wherein the second network interface is configured to receive the packet stream transmitted from the first network interface and to decode the packet stream to generate a second digital watermark,
wherein the second network interface is configured to perform a validation test on the packet stream and deliver the packet stream to the second intellectual property core when the first digital watermark is determined to match the second digital watermark,
wherein the second network interface is configured to invalidate the packet stream and generate a warning of a network attack when the first digital watermark is determined to not match the second digital watermark.

8. The system of claim 7, wherein the first network interface is further configured to encrypt the packet stream before encoding the first digital watermark into the packet stream, wherein the second network interface is further configured to decrypt the packet stream after the packet stream is decoded to generate the second digital watermark and the second digital watermark is determined to match the first digital watermark.

9. The system of claim 7, wherein the network attack comprises an eavesdropping attack.

10. The system of claim 7, wherein the second network interface is configured to generate a bit string representing the second digital watermark based on calculated delays associated with the set of packets in the packet stream.

11. The system of claim 10, wherein the second digital watermark is determined to match the first digital watermark when a Hamming distance between the first digital watermark and the second digital watermark is less than a defined error margin.

12. The system of claim 11, wherein the size of the set of packets, the defined shift amount, and the defined error margin are tunable.

13. The system of claim 7, wherein the second digital watermark is determined to match the first digital watermark when a Hamming distance between the first digital watermark and the second digital watermark is less than a defined error margin, wherein the size of the set of packets, the defined shift amount, and the defined error margin are tunable.

14. A method comprising:
providing a plurality of intellectual property cores integrated on a system-on-chip, the plurality of intellectual property cores comprising a first intellectual property core and a second intellectual property core that maintain a shared secret code;
encoding, by a first network interface integrated on the system-on-chip and connected to the first intellectual property core, a first digital watermark into a packet stream designated for the second intellectual property core, wherein the first digital watermark is based on the shared secret code maintained between the first intellectual property core and the second intellectual property core, wherein:
the first digital watermark is encoded into the packet stream based on timing information;
the first digital watermark is a bit string embedded in the packet stream by intentionally delaying a set of packets to shift a distribution of the packets by a defined shift amount representing watermark bits in the timing information of the packets;
the set of packets are selected by the first network interface using a pseudo-random number generator;
the first intellectual property core and the second intellectual property core share as a secret a size of the set of packets, the defined shift amount, an encryption key, and a seed for the pseudo-random number generator that selects the set of packets;
receiving, by a second network interface integrated on the system-on-chip and connected to the second intellectual property core, the packet stream transmitted from the first network interface;
decoding, by the second network interface, the packet stream to generate a second digital watermark;
testing, by the second network interface, validation of the packet stream based on the second digital watermark;
validating, by the second network interface, the packet stream when the first digital watermark is determined to match the second digital watermark, and
invalidating, by the second network interface, the packet stream when the first digital watermark is determined to not match the second digital watermark.

15. The method of claim 14, further comprising:
encrypting, by the first network interface, the packet stream before encoding the first digital watermark into the packet stream; and
decrypting, by the second network interface, the packet stream after the packet stream is decoded to generate the second digital watermark and the second digital watermark is determined to match the first digital watermark.

16. The method of claim 14, wherein the second network interface generates a bit string representing the second digital watermark based on calculated delays associated with the set of packets in the packet stream.

17. The method of claim 16, wherein the second digital watermark is determined to match the first digital watermark when a Hamming distance between the first digital watermark and the second digital watermark is less than a defined error margin.

18. The method of claim 17, wherein the size of the set of packets, the defined shift amount, and the defined error margin are tunable.

19. The method of claim 14, wherein the second digital watermark is determined to match the first digital watermark when a Hamming distance between the first digital watermark and the second digital watermark is less than a defined error margin, wherein the size of the set of packets, the defined shift amount, and the defined error margin are tunable.

20. The method of claim 14, wherein the second digital watermark is determined to match the first digital watermark when a Hamming distance between the first digital watermark and the second digital watermark is less than a defined error margin.

* * * * *